United States Patent
Jarrett et al.

(10) Patent No.: US 7,651,980 B2
(45) Date of Patent: Jan. 26, 2010

(54) HIGH TEMPERATURE FILTRATION CONTROL USING WATER BASED DRILLING FLUID SYSTEMS COMPRISING WATER SOLUBLE POLYMERS

(75) Inventors: Michael Jarrett, Houston, TX (US); Dennis Clapper, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 707 days.

(21) Appl. No.: 11/346,453

(22) Filed: Feb. 2, 2006

(65) Prior Publication Data

US 2007/0179064 A1    Aug. 2, 2007

(51) Int. Cl.
*C09K 8/36*     (2006.01)

(52) U.S. Cl. .................. 507/120; 507/123; 507/145; 507/222; 507/225; 507/229; 252/8.51; 252/8.515; 252/8.514

(58) Field of Classification Search ............ 507/120
See application file for complete search history.

(56) References Cited

U.S. PATENT DOCUMENTS

| | | | |
|---|---|---|---|
| 4,293,427 A | 10/1981 | Lucas et al. | |
| 4,645,609 A * | 2/1987 | Patel | 507/106 |
| 4,652,606 A | 3/1987 | Slingerland | |
| 4,741,843 A * | 5/1988 | Garvey et al. | 507/121 |
| 4,743,383 A | 5/1988 | Stewart et al. | |
| 5,502,030 A | 3/1996 | Patel | |
| 5,693,698 A | 12/1997 | Patel et al. | |
| 5,789,349 A | 8/1998 | Patel | |
| 5,855,244 A | 1/1999 | Ahmed et al. | |
| 6,030,928 A | 2/2000 | Stahl et al. | |
| 6,124,245 A | 9/2000 | Patel | |
| 6,196,317 B1 | 3/2001 | Hardy | |
| 6,590,050 B1 | 7/2003 | Bair et al. | |
| 6,767,867 B2 | 7/2004 | Chatterji et al. | |
| 6,818,596 B1 | 11/2004 | Hayes | |

OTHER PUBLICATIONS

The International Bureau of WIPO, "PCT International Preliminary Report on Patentability," Int'l Application No. PCT/US2007/001673, mailed Aug. 14, 2008 (6 pages).
ISA/US, "PCT Notification of Transmittal of the International Search Report and the Written Opinion of the International Searching Authority, or the Declaration," Int'l Application No. PCT/US07/01673, mailed Oct. 1, 2007 (9 pages).

\* cited by examiner

*Primary Examiner*—Timothy J. Kugel
*Assistant Examiner*—Atnaf Admasu
(74) *Attorney, Agent, or Firm*—Paula Morris; The Morris Law Firm, P.C.

(57) ABSTRACT

A method and drilling fluid system for providing filtration control during drilling operations using a drilling fluid system comprising water soluble polymer comprising acrylamide monomer, the method comprising: providing a drilling fluid system having effective rheological properties, the drilling fluid system comprising aqueous base consisting essentially of freshwater, a quantity of from about 21 to 58 kg/m$^3$ (7.5 to about 20 pounds per barrel) plugging agent, and an amount of bridging agent comprising water soluble polymer comprising acrylamide monomer which exhibits a 5% by weight Brookfield viscosity in freshwater of from about 50 cP to about 100 cP, and; contacting a subterranean formation with the drilling fluid system and maintaining effective filtration control at concentrations of about 10,000 ppm or less monovalent salt, as demonstrated in the laboratory by producing a HPHT filtrate of 25 cm$^3$/min or less after 30 minutes at about 149° C. (300° F.) after static aging of said drilling fluid system for a period of 16 hours or more at temperatures of about 260° C. (500° F.).

10 Claims, No Drawings

HIGH TEMPERATURE FILTRATION CONTROL USING WATER BASED DRILLING FLUID SYSTEMS COMPRISING WATER SOLUBLE POLYMERS

FIELD OF THE INVENTION

The present application relates to a method for providing filtration control during drilling operations at high temperatures. The present application also relates to water based drilling fluid systems that achieve high temperature filtration control using water soluble polymers.

BACKGROUND

Filtration control is an important property of a drilling fluid, particularly when drilling through permeable formations where the hydrostatic pressure exceeds the formation pressure. It is important for a drilling fluid to quickly form a filter cake which effectively minimizes fluid loss, but which also is thin and erodable enough to allow product to flow into the wellbore during production.

One type of filtration control additive used in water based fluids is water-soluble polymer, typically comprising acrylamide monomer. One disadvantage of water-soluble polymers is that they have limited temperature stability. As wells are drilled deeper, higher bottomhole temperatures are encountered.

Filtration control additives are needed which will quickly form a thin, erodable filter cake, and which have high temperature stability for prolonged periods of time.

BRIEF SUMMARY

The present application provides drilling fluid systems comprising water soluble polymer(s) comprising acrylamide monomer which exhibit effective rheological properties and high temperature high pressure (HTHP) filtration control at temperatures of 177° C. (350° F.) or more.

The present application provides drilling fluid systems comprising water soluble polymer comprising acrylamide monomer which exhibit effective rheological properties and HTHP filtration control at temperatures of 260° C. (500° F.) or more.

The present application provides a method for providing filtration control during drilling operations using a drilling fluid system comprising water soluble polymer comprising acrylamide monomer, the method comprising: providing a drilling fluid system having effective rheological properties, the drilling fluid system comprising aqueous base consisting essentially of freshwater, a quantity of from about 21 to 58 kg/m³ (7.5 to about 20 pounds per barrel) plugging agent, and an amount of bridging agent comprising water soluble polymer comprising acrylamide monomer which exhibits a 5% by weight Brookfield viscosity in freshwater of from about 50 cP to about 100 cP, and; contacting a subterranean formation with the drilling fluid system and maintaining effective filtration control at concentrations of about 10,000 ppm or less monovalent salt, as demonstrated in the laboratory by producing a HPHT filtrate of 25 cm³/min or less after 30 minutes at about 149° C. (300° F.) after static aging of said drilling fluid system for a period of 16 hours or more at temperatures of about 260° C. (500° F.).

The present application also provides a drilling fluid system comprising: an aqueous base consisting essentially of freshwater; a quantity of from about 21 to 58 kg/m³ (7.5 to 20 lb/bbl) plugging agent comprising sulfonated asphalt and lignite; bridging agent comprising an amount of water soluble polymer having a 5% by weight Brookfield viscosity in freshwater of from about 50 cP to about 100 cP, the water soluble polymer comprising first olefinic amide monomer copolymerized with monomer selected from the group consisting of sulfonate monomer and a combination of sulfonate monomer and N-vinyl lactam monomer, wherein the first olefinic amide monomer has the following structure:

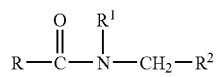

wherein R is a 1-alkenyl group and $R^1$ and $R^2$ independently are selected from the group consisting of hydrogen and alkyl groups having from 1 to 4 carbon atoms;
the sulfonate monomer has the following structure:

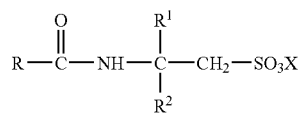

wherein R is selected from the group consisting of polymerizable alkenyl groups having from about 1 to about 4 carbon atoms; $R_1$ and $R_2$ are selected from the group consisting of hydrogen and methyl groups; and, X is a cation; and,
the N-vinyl lactam monomer has the following structure:

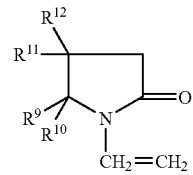

wherein $R^9$, $R^{10}$, $R^{11}$, and $R^{12}$ independently are selected from the group consisting of hydrogen, methyl groups, and ethyl groups.

wherein, after 16 hours of static aging of the drilling fluid system at about 260° C. (500° F.), the drilling fluid system exhibits a HPHT filtrate of 25 cm³/min or less after 30 minutes at about 149° C. (300° F.).

In one embodiment, the application provides a drilling fluid system comprising: an aqueous base consisting essentially of freshwater; bridging agent comprising from about 0.7 to about 29 kg/m³ (0.25 lb/bbl to about 10.0 lb/bbl) water soluble polymer having a 5% by weight Brookfield viscosity in freshwater of from about 50 cP to about 100 cP, the water soluble polymer comprising acrylamide monomer copolymerized with monomer selected from the group consisting of sulfonate monomer and a combination of sulfonate monomer and N-vinyl lactam monomer; and, a quantity of from about 21 to 58 kg/m³ (7.5 to 20 lb/bbl) plugging agent comprising sulfonated asphalt and lignite; wherein, after 16 hours of static aging of the drilling fluid system at about 260° C. (500° F.), the drilling fluid system exhibits a HPHT filtrate of 25 cm³/min or less after 30 minutes at about 149° C. (300° F.).

In one embodiment, the application provides a drilling fluid system comprising: an aqueous base consisting essentially of freshwater; bridging agent comprising from about 0.7 to about 29 kg/m³ (0.25 lb/bbl to about 10.0 lb/bbl) water soluble polymer having a 5% by weight Brookfield viscosity in freshwater of from about 50 cP to about 100 cP, said water soluble polymer comprising monomer of acrylamide, monomer of 2-acrylamido-2-methylpropane sulfonic acid or alkali metal salts thereof, and N-vinyl pyrrolidone monomer; and, from about 21 to 58 kg/m$^3$ (7.5 to 20 lb/bbl) plugging agent comprising sulfonated asphalt and lignite; wherein, after 16 hours of static aging of the drilling fluid system at about 260° C. (500° F.), the drilling fluid system exhibits a HPHT filtrate of 25 cm$^3$/min or less after 30 minutes at about 149° C. (300° F.).

In another embodiment, the application provides a drilling fluid system comprising: an aqueous base consisting essentially of freshwater; bridging agent comprising from about 0.7 to about 29 kg/m$^3$ (0.25 lb/bbl to about 10.0 lb/bbl) water soluble polymer having a 5% by weight Brookfield viscosity in freshwater of from about 50 to about 100 cP comprising monomers of acrylamide and 2-acrylamido-2-methylpropane sulfonic acid or alkali metal salts thereof; and, plugging agent comprising a quantity of from about 21 to 58 kg/m$^3$ (7.5 to 20 lb/bbl) sulfonated asphalt comprising lignite; wherein, after 16 hours of static aging of the drilling fluid system at about 260° C. (500° F.), the drilling fluid system exhibits a HPHT filtrate of 25 cm$^3$/min or less after 30 minutes at about 149° C. (300° F.).

DETAILED DESCRIPTION OF EMBODIMENTS

The present application provides a drilling fluid system which quickly forms a thin, erodable filter cake effective to minimize filtration of a drilling fluid system into the subterranean formation being treated. The drilling fluid system is stable for a prolonged period of time even after exposure to high temperatures. Effective filtration control is demonstrated in the laboratory when, after 16 hours of static aging at the temperature of expected exposure, the drilling fluid system exhibits a HPHT filtrate of 25 cm$^3$/min or less after 30 minutes at about 149° C. (300° F.). In one embodiment, the drilling fluid system exhibits a HPHT filtrate of 25 cm$^3$/min or less after 30 minutes at about 177° C. (350° F.) or more.

During drilling operations, the drilling fluid system maintains effective filtration control even after exposure to a temperature of 149° C. (300° F.) for a period of about 16 hours or more. In one embodiment, the drilling fluid system maintains effective filtration control even after exposure to a temperature of 177° C. (350° F.) for a period of about 16 hours or more. In one embodiment, the drilling fluid system maintains effective filtration control even after exposure to a temperature of 260° C. (500° F.) or more for a period of about 16 hours or more. In yet another embodiment, the drilling fluid system maintains effective filtration control even after exposure to a temperature of 287° C. (550° F.) or more for a period of about 16 hours or more.

The drilling fluid also is effective when exposed to 10,000 ppm or less monovalent salt. In one embodiment, the drilling fluid is exposed to 9,000 ppm or less monovalent salt.

The Drilling Fluid System

The drilling fluid system comprises an aqueous base, water soluble polymer, and plugging agent. The drilling fluid system also may contain other suitable components.

The Aqueous Base

In one embodiment, the aqueous base is freshwater. Although it is preferred for the aqueous base to be freshwater, the aqueous base may comprise about 10,000 ppm or less monovalent salt. In another embodiment, the aqueous base may comprise about 9,000 ppm or less monovalent salt. Typically, the salt content is a result of contamination.

Where present, the monovalent salt typically is the type of salt found in seawater and/or salt flows. Typically, the monovalent salt is sodium chloride. However, other monovalent salts may be present. Examples of monovalent salts that may be present include, but are not necessarily limited to sodium chloride, potassium chloride, sodium bromide, potassium bromide, sodium formate, potassium formate, cesium formate and mixtures thereof.

The Water Soluble Polymer

The water soluble polymer is thermally stable and comprises repeat units of a first olefinic amide monomer and one or more different olefinic monomers which, in combination, make the water soluble polymer effective as a bridging agent. In one embodiment, the first olefinic amide monomer is acrylamide. In one embodiment, the water soluble polymer is a copolymer of acrylamide monomer and sulfonate monomer. In this embodiment, an advantageous sulfonate monomer is 2-acrylamido-2-methylpropane sulfonic acid or alkali metal salts thereof ("AMPS"). Preferred copolymers of acrylamide monomer and AMPS are commercially available under the name PYRO-TROL®, a trademark of Baker Hughes Incorporated.

In another embodiment, the water soluble polymer is a terpolymer comprising acrylamide monomer, sulfonate monomer, and N-vinyl lactam monomer. In an advantageous embodiment, the water soluble polymers are terpolymers comprising (a) acrylamide monomer; (b) 2-acrylamido-2-methylpropane sulfonic acid or alkali metal salts thereof ("AMPS"); and (c) olefinic comonomer selected from the group consisting of acrylate monomer and N-vinyl lactam monomer. In one embodiment, (c) is acrylate monomer. In one embodiment, (c) is N-vinyl-2-pyrrolidone (NVP).

Suitable water soluble polymers generally have a 5% by weight Brookfield viscosity in freshwater of from 50 cP to 100 cP. Generally, water soluble polymers meeting this viscosity have a number average molecular weight of from about 500,000 to about 2,500,000. In one embodiment, the water soluble polymer has a number average molecular weight of from about 750,000 to about 1,500,000.

The drilling fluid system generally comprises from about 0.7 to about 29 kg/m$^3$ (0.25 lb/bbl to about 6.0 lb/bbl) water soluble polymer. In an advantageous embodiment, the drilling fluid system comprises 2.8 to about 11.5 kg/m$^3$ (1 to 4 lb/bbl) water soluble polymer.

First Olefinic Monomer

The first olefinic monomer is derived from acrylamide monomer and has the following general structure:

wherein R is a 1-alkenyl group and R$^1$ and R$^2$ independently are selected from the group consisting of hydrogen and alkyl groups having from 1 to 4 carbon atoms. In one embodiment, R$^1$ and R$^2$ are selected from the group consisting of hydrogen and methyl groups.

Sulfonate Monomer

In one embodiment, the third olefinic monomer is sulfonate monomer. In one embodiment, the sulfonate monomer has the following general structure:

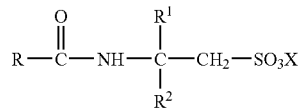

wherein R is selected from the group consisting of polymerizable alkenyl groups having from about 1 to about 4 carbon atoms; $R^1$ and $R^2$ are selected from the group consisting of hydrogen and methyl groups; and, X is a cation. Suitable cations are selected from the group consisting of hydrogen and alkali metal. An advantageous cation is hydrogen.

A preferred sulfonate is 2-acrylamido-2-methylpropane-sulfonic acid (AMPS), which has the following general structure:

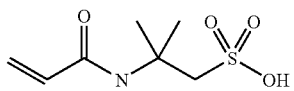

The Third Olefinic Monomer

In one embodiment, the third olefinic monomer is acrylate monomer, which has the following general structure:

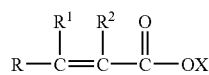

wherein $R^1$ and $R^2$ independently are selected from the group consisting of hydrogen and alkyl groups having from about 1 to about 4 carbon atoms; R is selected from the group consisting of hydrogen, alkyl groups having from about 1 to about 4 carbon atoms, and groups that activate the unsaturated carbon-carbon bond; and X is selected from the group consisting of hydrogen and alkali metal. In one embodiment, X is selected from the group consisting of hydrogen and sodium. In one embodiment, X is hydrogen. Examples of groups that activate the unsaturated carbon-carbon bond include, for example, groups comprising nitrogen, phosphorus, and sulfur.

—N-vinyl Lactam Monomer

In another embodiment, the third olefinic monomer is selected from N-vinyl lactam monomers having the following general structure:

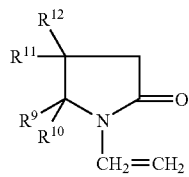

wherein $R^9$, $R^{10}$, $R^{11}$, and $R^{12}$ independently are selected from the group consisting of hydrogen, methyl groups, and ethyl groups. In one embodiment, $R^9$, $R^{10}$, $R^{11}$, and $R^{12}$ are the same. In one embodiment, the N-vinyl lactam monomer is N-vinyl-2-pyrrolidone (NVP), which is commercially available from a number of sources.

Mole Percent of Monomers

The mole percent of the various monomers will vary depending upon the monomers present and other factors. The embodiments described are illustrative only.

Where the water soluble polymer is a copolymer of acrylamide monomer and sulfonate monomer, the copolymer comprises less than 20 mole % sulfonate monomer. In another embodiment where the water soluble polymer is a copolymer of acrylamide monomer and sulfonate monomer, the copolymer comprises about 10 mole % or less sulfonate monomer.

In an advantageous embodiment, where the water soluble polymer is a copolymer of acrylamide monomer and sulfonate monomer. In one embodiment, the water soluble polymer is a copolymer of acrylamide monomer and about 10 mole % sulfonate monomer. In one embodiment, the sulfonate monomer is AMPS.

Where the water soluble polymer is a terpolymer of acrylamide monomer/sulfonate monomer/N-vinyl lactam monomer, the mole percent of acrylamide monomer is from about 10 mole % to about 20 mole %; the mole percent of sulfonate monomer is from about 50 mole % to about 60 mole %; and, the mole percent of N-vinyl lactam monomer is from about 25 mole % to about 35 mole %. In one embodiment, the mole percent of acrylamide monomer is from about 15 mole % to about 50 mole %; the mole percent of sulfonate monomer is from about 37.5 mole % to about 55 mole %; and, the mole percent of N-vinyl lactam monomer is from about 12.5 mole % to about 30 mole %. In one embodiment having the foregoing percentage composition, the N-vinyl lactam monomer is N-vinyl pyrrolidone (NVP).

In one embodiment, the water soluble polymer is a terpolymer having a mole ratio of 55:30:15 of AMPS:NVP:acrylamide. In another embodiment, the water soluble polymer is a terpolymer having a mole ratio of 50:37.5:12.5 of acrylamide:AMPS:acrylate.

The water soluble polymers may be made by any suitable method include, for example, the bead method and the spray dried powder method.

The Plugging Agent

In order to assist in forming an effective seal for filtration control, one embodiment of the drilling fluid system further comprises a plugging agent. The plugging agent is sufficiently soluble in the drilling fluid system to deform and to penetrate microfractures in the formation, which assists in sealing the formation. The plugging agent assists in maintaining filtration control in the presence of contamination by monovalent salt.

Examples of suitable plugging agents include, but are not necessarily limited to sized sulfonated asphalt, limestone, marble, mica, graphite, cellulosics, lignins, cellophanes, and latexes. In one embodiment, the plugging agent comprises sulfonated asphalt.

Sulfonated asphalts are generally produced by reacting an asphaltic material which is first mixed with a solvent followed by sulfonating the asphaltic material with a sulfonating agent. Suitable solvents include alkanes. An example is hexane. Suitable sulfonating agents include sulfur trioxide. The sulfonation process produces asphalt-sulfonic acid, which is neutralized with a basic compound. Suitable basic compounds include, for example, sodium hydroxide. See U.S. Pat. No. 4,741,868, which is incorporated herein by reference. In one embodiment, the sulfonated asphalt is in the form of a salt. In one embodiment, the sulfonated asphalt is in the form of a sodium salt or a potassium salt.

In an advantageous embodiment, the plugging agent comprises a combination of sulfonated asphalt and lignite. In one embodiment, the sulfonated asphalt comprises about 20 wt. % or more lignite. Suitably, the sulfonated asphalt comprises about 30 wt. % or less lignite. In a particularly advantageous embodiment, the sulfonated asphalt comprises from about 25 wt. % to about 28 wt. % lignite. A suitable commercial sulfonated asphalt is SULFA-TROLL, which is commercially available from Baker Hughes Drilling Fluids.

In one embodiment, the drilling fluid system advantageously comprises from about 21 to 58 kg/m$^3$ (7.5 to 20 lb/bbl) of plugging agent. In one embodiment, the drilling fluid system comprises about 10 lb/bbl sulfonated asphalt comprising from about 20 wt. % to about 30 wt. % lignite, based on the total weight of the plugging agent.

In one embodiment, the fluid further comprises thinner. Any suitable thinner may be used. In one embodiment, the thinner comprises causticized or uncausticized lignite. An exemplary commercially available lignite is LIGCO®, a trademark of Milwhite Mud Sales Company, Houston, Tex. An exemplary commercially available causticized lignite is LIGCON®, a trademark of Milchem Incorporated, Houston, Tex.

Other additives may be used in the drilling fluid system. Such additives include, but are not necessarily limited to shale stabilizer(s), other filtration control additive(s), suspending agent(s), dispersant(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides; one or more additional bridging agent, and combinations thereof.

The drilling fluid system may be used to drill substantially any formation. However, not all types of drilling fluid systems encounter extremely high temperatures. In one embodiment, the drilling fluid system is a drill-in or completion fluid—fluids which are more likely to be exposed to higher downhole temperatures for prolonged periods of time.

The drilling fluid system suitably has a density of about 9 lb/gal or more. Suitably, the drilling fluid system has a density of about 22 lb/gal or less.

The application will be better understood with reference to the following Examples which are for purposes of illustration only:

Procedures

Fluids were prepared using a variety of polymers from a variety of sources. The fluids were subjected to standard testing to determine rheological and fluid loss properties. HPHT was measured following the API test method described in "Recommended Practice Standard Procedure for Field Testing Water-Based Drilling Fluids," 113B-1, $3^{rd}$ edition, incorporated herein by reference. In some instances, the method was modified as indicated in the Examples.

In the following formulations, the Experimental Water Soluble Polymers from various sources and batches had the following monomeric content:
  A. 10 mole % AMPS polymerized with acrylamide;
  B. 20 mole % AMPS/acrylamide;
  C. 40 mole % AMPS:acrylamde;
  D. 50:37.5:12.5 mole % acrylamide:AMPS: acrylate terpolymer;
  E. 55:30:15 mole % terpolymer of AMPS:NVP:acrylamide; and,
  F. 90 weight percent NaAMPS (AMPS, sodium salt)/10 weight percent N,N-dimethylacrylamide A number of commercial products are used in the formulations described in the examples. The following is a description of these products and their sources:

Products Available from Baker Hushes Drilling Fluids:
  MIL-GEL™ is a ground montmorillonite used to simulate formation shale contaminant;
  MILGEL-NT™ is a ground montmorillonite used to simulate formation shale contaminant;
  CHEMTROL®-X is a blend of ground lignitic earth and synthetic maleic anhydride copolymers;
  MIL-TEMP® is a maleic anhydride copolymer useful to prevent thermal degradation of a drilling fluid system;
  MIL-CARB® and MIL-CARB® 5 are products comprising ground marble or calcium carbonate particles;
  MIL-BAR® is a barite additive;
  DFE-129™ is an acrylamide/AMPS copolymer;
  CHEK-LOSS® PLUS is a water-insoluble, ultra-fine, (lignin) material used for controlling seepage and loss of circulation while drilling through depleted or underpressured zones;
  SULFA-TROL® is a sulfonated asphalt;
  MAX-TROL® is a sulfonated resin additive for water-based mud systems;
  KEM-SEAL® PLUS is a water soluble polymer having about 90 wt. % NaAMPS (AMPS, sodium salt) and 10 wt. % N,N-dimethylacrylamide;
  ALL-TEMP® is an acrylate tetrapolymer.
  LIGCON® is causticized lignite;
  LIGCO® is lignite;
  PROTECTO-MAGIC™ is a ground asphalt.

Products Available from Other Commercial Sources:
  REV-DUST is a simulated drilled product which may be obtained from Mil-White Company, Houston, Tex.;
  POLYDRILL® is an anionic synthetic polymer commercially available from Degussa Construction Polymers GMBH Corporation, Fed. Rep. Germany;
  BORE-DRILL™ is an anionic synthetic polymer commercially available from Borden Chemicals;
  SOLTEX® is a sulfonated asphalt, commercially available from Chevron Phillips Chemical Company;
  DRISCAL D is a water soluble polymer provided by Drilling Specialties Company.

In a number of the examples, POLYDRILL® or another component is listed twice in order to show a difference in order of addition while mixing The application will be better understood with reference to the following examples, which are illustrative only:

EXAMPLE 1

In the following Example, the drilling fluid system had the following general formula, where the water soluble polymer was 10 mole % AMPS polymerized with acrylamide. The formula and the results are given in the following Table:

|  | Experimental Water Soluble Polymer | | |
| --- | --- | --- | --- |
|  | A | A | A |
| Freshwater, ml (lb) | 239 | 239 | 239 |
|  | (0.68) | (0.68) | (0.68) |
| MILGEL ™ NT, kg (lb) | 4.5 | 4.5 | 4.5 |
|  | (10.0) | (10.0) | (10.0) |
| CHEMTROL ® X, kg (lb) | 4.5 | 4.5 | 4.5 |
|  | (10.0) | (10.0) | (10.0) |

| -continued | | | |
|---|---|---|---|
| Caustic Soda, kg (lb) | 0.23 (0.5) | 0.23 (0.5) | 0.23 (0.5) |
| MIL-TEMP ®, kg (lb) | 0.9 (2.0) | 0.9 (2.0) | 0.9 (2.0) |
| 10 mole % AMPS polymerized with acrylamide, kg (lb) | 0.9 (2.0) | 0.9 (2.0) | 0.9 (2.0) |
| MIL-CARB ®, kg (lb) | 4.5 (10.0) | 4.5 (10.0) | 4.5 (10.0) |
| MIL-CARB ® 5, kg (lb) | 2.3 (5.0) | 2.3 (5.0) | 2.3 (5.0) |
| MIL-BAR ®, kg (lb) | 182.7 (403.0) | 182.7 (403.0) | 182.7 (403.0) |

| FLUID PROPERTIES Fann 35 at 49° C. (120° F.) | | | | | | |
|---|---|---|---|---|---|---|
| | Initial | 232° C. (450° F.) Static Age 16 Hours | Initial | 232° C. (450° F.) Static Age 16 Hours | Initial | 232° C. (450° F.) Static Age 16 Hours |
| 600 rpm | 90 | 147 | 72 | 142 | 69 | 140 |
| 300 rpm | 50 | 87 | 39 | 83 | 38 | 82 |
| 200 rpm | 36 | 64 | 28 | 60 | 28 | 61 |
| 100 rpm | 22 | 39 | 12 | 37 | 12 | 38 |
| 6 rpm | 5 | 9 | 5 | 8 | 5 | 9 |
| 3 rpm | 4 | 7 | 4 | 6 | 4 | 7 |
| Plastic Viscosity, cP | 40 | 60 | 33 | 59 | 31 | 58 |
| Yield Point, Pa (lb/100 ft$^2$) | 4.8 (10) | 12.9 (27) | 2.9 (6) | 11.5 (24) | 3.4 (7) | 11.5 (24) |
| Gels, Pa (lb/100 ft$^2$) | 2.9/3.4 (6/7) | 4.3/16.3 (9/34) | 2.4/3.4 (5/7) | 3.8/9.58 (8/20) | 2.4/3.4 (5/7) | 4.3/11 (9/23) |
| API fluid loss, cm$^3$/30 min | 2.0 | 2.3 | 2.1 | 2.5 | 2.4 | 3.0 |
| 300° F. HPHT filtrate, cm$^3$/30 min | — | 22 | — | 19 | — | 21 |
| pH | 9.1 | 8.8 | 9.3 | 9.0 | 8.7 | 8.7 |

Without added NaCl, after 16 hours of static aging at about 232° C. (450° F.), all of the formulations measured exhibited an HPHT filtrate of 25 cm$^3$/min or less after 30 minutes at about 148.9° C. (300° F.).

EXAMPLE 2

In the following test, the drilling fluid system had the following general formula, where the water soluble polymer was (D) 50:37.5:12.5 mole % acrylamide:AMPS:acrylate or (E) and 55:30:15 weight % terpolymer of AMPS:NVP:acrylamide. The formulas and the results are given in the following Table:

| | Form. | | | | | |
|---|---|---|---|---|---|---|
| | 1 | 2 | 3 | 4 | 5 | 6 |
| | | | Experimental Water Soluble Polymer | | | |
| | D | E | D | E | D | E |
| Freshwater, m$^3$ (bbl) | 0.07 (0.56) | 0.07 (0.56) | 0.07 (0.56) | 0.07 (0.56) | 0.07 (0.56) | 0.07 (0.56) |
| MIL-GEL ™, kg (lb) | 2.3 (5.0) | 2.3 (5.0) | 2.3 (5.0) | 2.3 (5.0) | 1.8 (4.0) | 1.8 (4.0) |
| MIL-TEMP ®, kg (lb) | 0.7 (1.5) | 0.7 (1.5) | 0.7 (1.5) | 0.7 (1.5) | 1.1 (2.5) | 1.1 (2.5) |
| CHEM-TROL ® X, kg (lb) | 2.7 (6.0) | 2.7 (6.0) | 2.7 (6.0) | 2.7 (6.0) | 2.3 (5.0) | 2.3 (5.0) |

-continued

| | | | | | | |
|---|---|---|---|---|---|---|
| Caustic soda, kg (lb) | 0.2 (0.5) | 0.2 (0.5) | 0.2 (0.5) | 0.2 (0.5) | 0.2 (0.5) | 0.2 (0.5) |
| KEM-SEAL ® PLUS, kg (lb) | 0.5 (1.0) | 0.5 (1.0) | 0.5 (1.0) | 0.5 (1.0) | 0.5 (0.5) | 0.5 (0.5) |
| Experimental water soluble polymer, kg (lb) | 0.9 (2.0) | 0.9 (2.0) | 0.9 (2.0) | 0.9 (2.0) | 0.9 (2.0) | 0.9 (2.0) |
| POLY-DRILL ™, lb (kg) | 3.6 (8.0) | 3.6 (8.0) | 3.6 (8.0) | 3.6 (8.0) | 3.2 (7.0) | 3.2 (7.0) |
| MIL-CARB ®, kg (lb) | 4.5 (10) | 4.5 (10) | 4.5 (10) | 4.5 (10) | 4.5 (10) | 4.5 (10) |
| MIL-BAR ®, kg (lb) | 248.4 (547.7) | 248.4 (547.7) | 248.4 (547.7) | 248.4 (547.7) | 248.4 (547.7) | 248.4 (547.7) |

| | Form. | | | | | | | | | | | |
|---|---|---|---|---|---|---|---|---|---|---|---|---|
| | 1 | | 2 | | 3 | | 4 | | 5 | | 6 | |
| | FLUID PROPERTIES Fann 35 at 49° C. (120° F.) | | | | | | | | | | | |
| | 204° C. (400° F.) Static Age | | 204° C. (400° F.) Static Age | | 260° C. (500° F.) Static Age | | 260° C. (500° F.) Static Age | | 260° C. (500° F.) Static Age | | 260° C. (500° F.) Static Age | |
| | Initial | 16 Hours | Initial | 16 Hours | Initial | 16 Hours | Initial | 16 Hours | Initial | 16 Hours | Initial | 16 Hours |
| 600 rpm | 124 | 119 | 188 | 153 | 131 | | >300 | | 108 | 100 | 161 | 237 |
| 300 rpm | 68 | 82 | 107 | 104 | 108 | | >300 | | 57 | 69 | 92 | 196 |
| 200 rpm | 49 | 69 | 77 | 87 | 100 | | >300 | | 40 | 60 | 66 | 185 |
| 100 rpm | 29 | 52 | 45 | 65 | 88 | | >300 | | 23 | 48 | 37 | 161 |
| 6 rpm | 6 | 29 | 7 | 32 | 71 | | 265 | | 5 | 30 | 5 | 125 |
| 3 rpm | 4 | 29 | 5 | 32 | 70 | | 240 | | 4 | 27 | 3 | 122 |
| Plastic Viscosity, cP | 56 | 37 | 81 | 49 | 23 | | NM* | | 51 | 31 | 69 | 41 |
| Yield Point, Pa (lb/100 ft²) | 5.7 (12) | 23.5 (45) | 12.5 (26) | 26.3 (55) | 40.7 (85) | | NM* | | 2.9 (6) | 18.2 (38) | 6.2 (23) | 72.3 (155) |
| Gels, Pa (lb/100 ft²) | 2.4/4.3 (5/9) | 17.2/28.7 (36/60) | 2.9/5.2 (6/11) | 21.1/35.9 (44/75) | 39.7/56 (83/117) | | 96.7/98.2 (202/205) | | 2.4/3.3 (5/8) | 16.3/32.6 (34/68) | 2.4/4.3 (5/9) | 59.4/60 (124/125) |
| API fluid loss, cm³/30 min | 1.4 | 1.9 | 1.8 | 1.8 | 2.6 | | — | | 1.8 | 3.0 | 1.3 | 4.6 |
| 177° C. (350° F.) HPHT filtrate, cm³/30 min | — | 6.0 | — | 11 | <1† | | — | | — | 16 | — | — |
| pH | 9.5 | 8.8 | 9.5 | 8.7 | 8.4 | | — | | 9.5 | 8.4 | 9.6 | 8.5 |

†Possible plugged valve stem during HPHT filtration
*Non measurable.

Without added NaCl, after 16 hours of static aging at about 204° C. (400° F.) for Formulas 1 and 2 and at 260° C. (500° F.) for Formulas 3-6, all of the formulations for which HPHT filtrate was measured exhibited an HPHT filtrate of 25 cm³/min or less after 30 minutes at about 177° C. (350° F.). The yield points were more variable than desired, so further study was undertaken to determine how to stabilize the yield point, among other things.

EXAMPLE 3

In the following test, the drilling fluid system had the following general formula, where the water soluble polymer was (D) 50:37.5:12.5 mole % acrylamide:AMPS:acrylate. The formulas and the results are given in the following Table:

| | Form. | | | | | |
|---|---|---|---|---|---|---|
| | 7 | 8 | 9 | 10 | 11 | 12 |
| | | | Experimental Water Soluble Polymer | | | |
| | D | D | D | D | D | D |
| Freshwater, ml(bbl) | 196 (0.56) | 196 (0.56) | 196 (0.56) | 196 (0.56) | 196 (0.56) | 196 (0.56) |
| MIL-GEL™, kg (lb) | 1.4 (3.0) | 1.6 (3.5) | 1.4 (3.0) | 2.3 (4.0) | 1.4 (3.0) | 1.4 (3.0) |
| MIL-TEMP®, kg (lb) | 0.9 (2.0) | 0.9 (2.0) | 1.1 (2.5) | 1.1 (2.5) | 0.9 (2.0) | 0.9 (2.0) |
| CHEM-TROL® X, kg (lb) | 2.3 (5.0) | 2.3 (5.0) | 1.1 (2.5) | 2.3 (5.0) | 2.3 (5.0) | 2.3 (5.0) |
| Caustic soda, kg (lb) | 0.2 (0.5) | 0.2 (0.5) | 0.2 (0.5) | 0.2 (0.5) | 0.2 (0.5) | 0.2 (0.5) |
| KEM-SEAL® PLUS, kg (lb) | — | 0.2 (0.5) | 0.2 (0.5) | — | — | 0.2 (0.5) |
| Experimental Water soluble polymer, kg (lb) | 1.1 (2.5) | 1.1 (2.5) | 1.1 (2.5) | 0.9 (2.0) | 1.4 (3.0) | 0.9 (2.0) |
| POLY-DRILL™, kg (lb) | 3 (7.0) | 3 (7.0) | 3 (7.0) | 3 (7.0) | 2.3 (5.0) | 1.6 (3.5) |
| MIL-CARB®, kg (lb) | 2.3 (5.0) | 2.3 (5.0) | 2.3 (5.0) | 4.5 (10) | 4.5 (10) | 4.5 (10) |
| MIL-BAR®, kg (lb) | 248.4 (547.7) | 248.4 (547.7) | 248.4 (547.7) | 248.4 (547.7) | 248.4 (547.7) | 248.4 (547.7) |

| | Form. | | | | | | | | | | | |
|---|---|---|---|---|---|---|---|---|---|---|---|---|
| | 7 | | 8 | | 9 | | 10 | | 11 | | 12 | |
| | FLUID PROPERTIES Fann 35 at 49° C. (120° F.) | | | | | | | | | | | |
| | | 260° C. (500° F.) Static Age 16 | | 260° C. (500° F.) Static Age 16 | | 260° C. (500° F.) Static Age 16 | | 260° C. (500° F.) Static Age 16 | | 260° C. (500° F.) Static Age 16 | | 260° C. (500° F.) Static Age 16 |
| | Initial | Hours | Initial | Hours | Initial | Hours | Initial | Hours | Initial | Hours | Initial | Hours |
| 600 rpm | 76 | 85 | 103 | 80 | 104 | 69 | 78 | 96 | 89 | 70 | 118 | 81 |
| 300 rpm | 39 | 52 | 53 | 49 | 54 | 44 | 39 | 59 | 45 | 44 | 60 | 41 |
| 200 rpm | 27 | 41 | 38 | 37 | 38 | 34 | 27 | 47 | 33 | 33 | 42 | 26 |
| 100 rpm | 15 | 29 | 21 | 26 | 21 | 24 | 15 | 34 | 19 | 22 | 24 | 13 |
| 6 rpm | 3 | 14 | 4 | 13 | 4 | 11 | 3 | 20 | 4 | 9 | 4 | 2 |
| 3 rpm | 2 | 12 | 3 | 13 | 3 | 10 | 2 | 19 | 3 | 9 | 3 | 1 |
| Plastic Viscosity, cP | 37 | 33 | 50 | 31 | 50 | 25 | 39 | 37 | 34 | 26 | 58 | 40 |
| Yield Point, Pa (lb/100 ft²) | 0.96 (2) | 9.1 (19) | 1.4 (3) | 8.6 (18) | 1.9 (4) | 9.1 (19) | 0 (0) | 10.5 (22) | 5.3 (11) | 8.6 (18) | 8.6 (18) | 0.48 (1) |
| Gels, Pa(lb/100 ft²) | 1.4/2.9 (3/6) | 8.6/18.2 (18/38) | 2.4/2.9 (5/6) | 10/19.6 (21/41) | 2.4/3.4 (5/7) | 8.1/14.8 (17/31) | 1.9/2.9 (4/6) | 13.9/33 (29/69) | 1.9/3.4 (4/7) | 7.7/18.7 (16/39) | 2.5/3.4 (5/7) | .96/7.7 (2/16) |
| API fluid loss, cm³/30 min | 2.5 | 3.0 | 1.6 | 2.6 | 2.7 | 4.0 | 1.9 | 2.6 | 3.0 | 3.2 | 2.5 | 2.6 |
| 177° C. (350° F.) HPHT filtrate, cm³/30 min | — | *80 | — | *50 | — | — | — | — | — | 50 (6 min) | — | 50 (26 min) |
| pH | 9.7 | 8.2 | 9.5 | 8.3 | 9.5 | 8.3 | 9.5 | 8.6 | 9.5 | 8.6 | 9.6 | 8.5 |

Surprisingly, even in the absence of added NaCl, after 16 hours of static aging at about 260° C. (500° F.), all of the formulations for which HPHT filtrate was measured exhibited an HPHT filtrate of greater than 25 cm³/min after 30 minutes or less at about 177° C. (350° F.). The results are believed to be attributable to variability in the properties of the commercially available polymer.

EXAMPLE 4

In the following test, the drilling fluid system had the following general formula, where the water soluble polymer was (D) 50:37.5:12.5 mole % acrylamide:AMPS:acrylate or (A) 10 mole % AMPS polymerized with acrylamide. The formulas and the results are given in the following Table:

|  | Formulation | | | | |
| --- | --- | --- | --- | --- | --- |
|  | 13 | 14 | 15 | 16 | 17 |
|  | Experimental Water Soluble Polymer | | | | |
|  | D | D | A | A | D |
| Freshwater, ml(bbl) | 196 (0.56) | 196 (0.56) | 176 (0.50) | 196 (0.50) | 196 (0.56) |
| MIL-GEL ™, kg (lb) | 1.4 (3.0) | 1.4 (3.0) | 2.3 (4.0) | 2.3 (4.0) | 2.3 (4.0) |
| MIL-TEMP ®, kg (lb) | 0.9 (2.0) | 0.9 (2.0) | 1.1 (2.5) | 1.1 (2.5) | 1.1 (2.5) |
| CHEM-TROL ® X, kg (lb) | 2.3 (5.0) | 2.3 (5.0) | 2.3 (5.0) | 2.3 (5.0) | 1.1 (2.5) |
| Caustic soda, kg (lb) | 0.23 (0.5) | 0.23 (0.5) | 0.23 (0.5) | 0.23 (0.5) | — |
| KEM-SEAL ® PLUS, kg (lb) | 0.5 (1.0) | 0.5 (1.0) | 0.23 (0.5) | 0.23 (0.5) | 0.23 (0.5) |
| Experimental Water soluble polymer, kg (lb) | 0.9 (2.0) | 0.9 (2.0) | 0.9 (2.0) | 0.9 (2.0) | 0.9 (2.0) |
| MAX-TROL ®, kg (lb) | 1.6 (3.5) | — | — | — | — |
| POLYDRILL ™, kg (lb) | — | — | 3.2 (7.0) | 3.2 (7.0) | 4 (9.0) |
| BOREDRILL ™, kg (lb) | — | 1.6 (3.5) | — | — | — |
| MIL-CARB ®, kg (lb) | 4.5 (10) | 4.5 (10) | 4.5 (10) | 4.5 (10) | 4.5 (10) |
| MIL-BAR ®, kg (lb) | 248.4 (547.7) | 248.4 (547.7) | 248.4 (547.7) | 248.4 (547.7) | 248.4 (547.7) |
| Caustic soda, kg (lb) | — | — | — | — | Adj. pH to 9.0 |

|  | Formulation | | | | | | | | | |
| --- | --- | --- | --- | --- | --- | --- | --- | --- | --- | --- |
|  | 13 | | 14 | | 15 | | 16 | | 17 | |
|  | FLUID PROPERTIES Fann 35 at 49° C. (120° F.) | | | | | | | | | |
|  | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | 117 | 71 | 166 | 164 | 233 | 85 | 279 | 123 | 116 | 72 |
| 300 rpm | 58 | 35 | 89 | 96 | 127 | 47 | 156 | 72 | 66 | 47 |
| 200 rpm | 40 | 24 | 62 | 72 | 91 | 35 | 117 | 54 | 47 | 37 |
| 100 rpm | 22 | 14 | 34 | 45 | 53 | 23 | 68 | 35 | 27 | 27 |
| 6 rpm | 4 | 2 | 5 | 8 | 9 | 8 | 12 | 10 | 5 | 13 |
| 3 rpm | 2 | 2 | 3 | 6 | 7 | 6 | 9 | 8 | 3 | 11 |
| Plastic Viscosity, Cp | 59 | 36 | 77 | 68 | 106 | 38 | 123 | 51 | 50 | 25 |
| Yield Point, Pa(lb/100 ft²) | −0.47 (−1) | −0.47 (−1) | 5.7 (12) | 13.4 (28) | 10 (21) | 4.3 (9) | 15.8 (33) | 10 (21) | 7.7 (16) | 10.5 (22) |
| Gels, Pa (lb/100 ft²) | 1.9/2. (4/5) | 2.4/8.1 (5/17) | 2.4/3 (5/6) | 7.7/23 (16/48) | 4.8/9.6 (10/20) | 6.2/17.7 (13/37) | 6.2/12 (13/26) | 7.7/19. (16/40) | 2.4/8.6 (5/18) | 8.6/21 (18/45) |
| API fluid loss, cm³/30 min | 2.4 | 8.2 | 2.8 | >10 | 2.6 | 2.2 | 2.6 | 2.6 | 1.8 | 3.5 |
| 177° C. (350° F.) HPHT filtrate, cm³/30 min | — | — | — | — | — | NC | — | >50 | — | 35 |
| pH | 9.9 | 8.3 | 9.9 | 8.1 | 9.0 | 8.2 | 9.0 | 8.3 | 9.0 | 8.2 |

Surprisingly, even in the absence of added NaCl, after 16 hours of static aging at about 260° C. (500° F.), all of the formulations for which HPHT filtrate was measured exhibited an HPHT filtrate of greater than 25 cm³/min after 30 minutes or less at about 177° C. (350° F.). The results are believed to be attributable to variability in the properties of the commercially available polymer.

EXAMPLE 5

In the following test, the drilling fluid system had the following general formula, where the water soluble polymer was (D) 50:37.5:12.5 mole % acrylamide:AMPS:acrylate or (A) 10 mole % AMPS polymerized with acrylamide. The formulas and the results are given in the following Table:

| | Formulation | | | | |
|---|---|---|---|---|---|
| | 18 | 19 | 20 | 21 | 22 |
| | | | Experimental water soluble polymer | | |
| | D | D | A | A | A |
| Freshwater, ml | 196 | 196 | 196 | 196 | 196 |
| (bbl) | (0.56) | (0.56) | (0.56) | (0.56) | (0.56) |
| MIL-GEL ™, kg | 2.3 | 2.3 | 2.3 | 2.3 | 2.3 |
| (lb) | (4.0) | (4.0) | (5.0) | (5.0) | (5.0) |
| MIL-TEMP ®, kg | 1.1 | 1.1 | 0.7 | 0.7 | 0.7 |
| (lb) | (2.5) | (2.5) | (1.5) | (1.5) | (1.5) |
| CHEM-TROL ® X, kg | 3.2 | 1.6 | 2.7 | 2.7 | 2.7 |
| (lb) | (7.0) | (3.5) | (6.0) | (6.0) | (6.0) |
| Caustic soda, kg | — | — | 0.23 | 0.23 | 0.23 |
| (lb) | | | (0.5) | (0.5) | (0.5) |
| KEM-SEAL ® PLUS, kg | 0.5 | 0.5 | 0.5 | 0.5 | 0.5 |
| (lb) | (1.0) | (1.0) | (1.0) | (1.0) | (1.0) |
| Experimental Water Soluble Polymer, kg | 1.1 | 1.1 | 0.9 | 0.9 | 0.9 |
| (lb) | (2.5) | (2.5) | (2.0) | (2.0) | (2.0) |
| MAX-TROL ®, kg (lb) | — | — | — | — | — |
| POLYDRILL ™, kg | 1.6 | 3.2 | 3.6 | 3.6 | 3.6 |
| (lb) | (3.5) | (7.0) | (8.0) | (8.0) | (8.0) |
| BOREDRILL ™, kg (lb) | — | — | — | — | — |
| MIL-CARB ®, kg | 4.5 | 4.5 | 4.5 | 4.5 | 4.5 |
| (lb) | (10) | (10) | (10) | (10) | (10) |
| MIL-BAR ®, kg | 248.4 | 248.4 | 248.4 | 248.4 | 248.4 |
| (lb) | (547.7) | (547.7) | (547.7) | (547.7) | (547.7) |
| Caustic soda, kg (lb) | Adj. pH to 9.0 | Adj. pH to 9.0 | — | — | — |

| | Formulation | | | | | | | | |
|---|---|---|---|---|---|---|---|---|---|
| | 18 | | 19 | | 20 | | 21 | | 22 |
| | | | | FLUID PROPERTIES Fann 35 at 49° C. (120° F.) | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | | 168 | | 66 | | 223 | | 112 | 224 | 131 |
| 300 rpm | | 92 | | 38 | | 123 | | 67 | 131 | 88 |
| 200 rpm | | 66 | | 26 | | 87 | | 52 | 93 | 73 |
| 100 rpm | | 38 | | 16 | | 50 | | 37 | 54 | 55 |
| 6 rpm | | 7 | | 3 | | 9 | | 15 | 9 | 32 |
| 3 rpm | | 4 | | 2 | | 6 | | 15 | 7 | 32 |
| Plastic Viscosity, Cp | | 76 | | 28 | | 101 | | 45 | 93 | 43 |
| Yield Point, Pa(lb/100 ft²) | | 7.7 (16) | | 4.8 (10) | | 10 (21) | | 10.5 (22) | 18.2 (38) | 21.5 (45) |
| Gels, Pa (lb/100 ft²) | | 2.9/4.3 (6/9) | | 3.8/11.5 (8/24) | | 3.8/6.2 (8/13) | | 12/30.6 (25/64) | 4.3/7.2 (9/15) | 21.5/39 (45/82) |
| API fluid loss, cm³/30 min | | 2.5 | | 3.4 | | 0.9 | | 1.8 | 1.7 | 2.2 |
| 177° C. (350° F.) HPHT filtrate, cm³/30 min | | — | | 76 | | — | | 22 | — | 14 |
| pH | | 9.0 | | 8.2 | | 9.8 | | 9.0 | 9.8 | 8.5 |

After 16 hours of static aging at about 260° C. (500° F.), Formula 19 exhibited an HPHT filtrate of greater than 25 cm³/min after 30 minutes or less at about 177° C. (350° F.), and Formulas 21 and 22 exhibited an HPHT filtrate of less than 25 cm³/min after 30 minutes at about 177° C. (350° F.). The negative results for Formula 19 are believed to be attributable to variability in the properties of the commercially available polymer.

EXAMPLE 6

In the following test, the drilling fluid system had the following general formula, where the water soluble polymer was 10 mole % AMPS polymerized with acrylamide. The formulas and the results are given in the following Table:

| | Form. 21 (con't) | Form. 22 (con't) | Form. 23 | Form. 24 |
|---|---|---|---|---|
| Experimental Water Soluble Polymer | A | A | A | A |
| Freshwater, ml(bbl) | 196 (0.56) | 196 (0.56) | 196 (0.56) | 176 (0.50) |
| MIL-GEL ™, kg (lb) | 2.3 (5.0) | 2.3 (5.0) | 2.3 (5.0) | 2.3 (5.0) |
| MIL-TEMP ®, kg (lb) | 0.7 (1.5) | 0.7 (1.5) | 0.7 (1.5) | 0.7 (1.5) |
| CHEM-TROL ® X, kg (lb) | 2.7 (6.0) | 2.7 (6.0) | 2.7 (6.0) | 2.7 (6.0) |
| Caustic soda, kg (lb) | 0.23 (0.5) | 0.23 (0.5) | 0.23 (0.5) | 0.23 (0.5) |
| KEM-SEAL ® PLUS, kg (lb) | 0.5 (1.0) | 0.5 (1.0) | 0.5 (1.0) | 0.5 (1.0) |
| Experimental Water Soluble Polymer, kg (lb) | 0.9 (2.0) | 0.9 (2.0) | 0.9 (2.0) | 0.9 (2.0) |
| POLY-DRILL ™, kg (lb) | 3.6 (8.0) | 3.6 (8.0) | 3.6 (8.0) | 3.6 (8.0) |
| MIL-CARB ®, kg (lb) | 4.5 (10) | 4.5 (10) | 4.5 (10) | 4.5 (10) |
| MIL-BAR ®, kg (lb) | 248.4 (547.7) | 248.4 (547.7) | 248.4 (547.7) | 248.4 (547.7) |
| Caustic soda, kg (lb) | — | — | — | — |

| | Form. 21 (con't) | | Form. 22 (con't) | | Form. 23 | | | | Form. 24 | |
|---|---|---|---|---|---|---|---|---|---|---|
| FLUID PROPERTIES Fann 35 at 49° C. (120° F.) | | | | | | | | | | |
| | 260° C. (500° F.) Static Age 48 Hours | 260° C. (500° F.) Static Age 72 Hours | 260° C. (500° F.) Static Age 48 Hours | 260° C. (500° F.) Static Age 72 Hours | Initial | 260° C. (500° F.) Static Age 16 Hours | 260° C. (500° F.) Static Age 48 Hours | 260° C. (500° F.) Static Age 72 Hours | Initial | 260° C. (500° F.) Static Age 16 Hours |
| 600 rpm | 113 | 103 | 169 | 105 | 243 | 124 | 109 | 100 | >300 | 96 |
| 300 rpm | 62 | 54 | 111 | 64 | 134 | 79 | 63 | 50 | 226 | 76 |
| 200 rpm | 45 | 39 | 90 | 49 | 96 | 65 | 47 | 35 | 169 | 68 |
| 100 rpm | 28 | 23 | 67 | 34 | 55 | 48 | 30 | 21 | 115 | 55 |
| 6 rpm | 9 | 5 | 38 | 14 | 8 | 26 | 9 | 4 | 25 | 40 |
| 3 rpm | 9 | 4 | 38 | 14 | 6 | 27 | 7 | 3 | 21 | 40 |
| Plastic Viscosity, Cp | 51 | 49 | 58 | 41 | 109 | 45 | 46 | 50 | NM | 20 |
| Yield Point, Pa(lb/100 ft²) | 5.2 (11) | 2.4 (5) | 25.4 (53) | 11 (23) | 12 (25) | 16.3 (34) | 8.1 (17) | 0 (0) | NM | 26.8 (56) |
| Gels, Pa (lb/100 ft²) | 7.7/21.5 (16/45) | 4.8/14.8 (10/31) | 24.9/45.4 (52/95) | 12/25.3 (25/53) | 3.8/5.7 (8/12) | 18.2/36.4 (38/76) | 8.6/21.5 (18/45) | 4.3/14.8 (9/31) | 13.9/28.7 (29/60) | 23/35.4 (48/74) |
| API fluid loss, cm³/30 min | 2.8 | 2.2 | 2.6 | 2.2 | 1.0 | 1.9 | 2.0 | 2.2 | 3.0 | 2.4 |
| 177° C. (350° F.) HPHT filtrate, cm³/30 min | 52 (14 min) | — | 31 | 16 | — | 21 | 16 | 16 | — | 15 |
| pH | 8.8 | 8.6 | 8.7 | 8.6 | 9.4 | 8.5 | 8.4 | 8.4 | 6.6 | 9.2 |
| Settling | | | | | | | | | None | |

After 16 hours of static aging at about 260° C. (500° F.), Formulas 21 and 22 exhibited an HPHT filtrate of greater than 25 cm³/min after 30 minutes or less at about 177° C. (350° F.), and Formulas 23 and 24 exhibited an HPHT filtrate of less than 25 cm³/min after 30 minutes at about 177° C. (350° F.). The result was believed to be attributable to variability among commercially available polymers.

EXAMPLE 7

In the following test, the drilling fluid system had the following general formula, where the water soluble polymer was (A) 10 mole % AMPS polymerized with acrylamide. The formulas and the results are given in the following Table:

|  | Formulation | | | |
|---|---|---|---|---|
|  | 25 | 26 | 27 | 28 |
|  | Experimental Water Soluble Polymer | | | |
|  | A | A | A | A |
| Freshwater, ml(bbl) | 176 (0.50) | 176 (0.50) | 196 (0.56) | 196 (0.56) |
| MIL-GEL ™, kg (lb) | 2.3 (5.0) | 2.3 (5.0) | 2.3 (4.0) | 2.3 (4.0) |
| MIL-TEMP ®, kg (lb) | 0.7 (1.5) | 0.7 (1.5) | 0.9 (2.0) | 0.9 (2.0) |
| CHEM-TROL ® X, kg (lb) | 2.7 (6.0) | 2.7 (6.0) | 2.3 (5.0) | 3.6 (8.0) |
| Caustic soda, kg (lb) | 0.23 (0.5) | 0.23 (0.5) | 0.23 (0.5) | 0.34 (0.75) |
| KEM-SEAL ® PLUS, kg (lb) | 0.5 (1.0) | 0.5 (1.0) | 0.5 (1.0) | 0.5 (1.0) |
| Experimental Water Soluble Polymer, kg (lb) | 0.9 (2.0) | 0.9 (2.0) | 0.9 (2.0) | 0.9 (2.0) |
| MAX-TROL ®, kg (lb) | — | — | — | — |
| POLYDRILL ™, kg (lb) | 3.6 (8.0) | 3.6 (8.0) | 3.2 (7.0) | 2.3 (5.0) |
| BOREDRILL ™, kg (lb) | — | — | — | — |
| MIL-CARB ®, kg (lb) | 4.5 (10) | 4.5 (10) | 4.5 (10) | 4.5 (10) |
| MIL-BAR ®, kg (lb) | 248.4 (547.7) | 248.4 (547.7) | 248.4 (547.7) | 248.4 (547.7) |
| Caustic soda, kg (lb) | — | — | — | — |

|  | Formulation | | | | | | | | | | |
|---|---|---|---|---|---|---|---|---|---|---|---|
|  | 25 | | 26 | | | | 27 | | | | 28 |
|  | FLUID PROPERTIES Fann 35 at 49° C. (120° F.) | | | | | | | | | | |
|  | Initial | 260° C. (500° F.) Static Age 16 Hours | Initial | 260° C. (500° F.) Static Age 16 Hours | 260° C. (500° F.) Static Age 48 Hours | 260° C. (500° F.) Static Age 72 Hours | Initial | 260° C. (500° F.) Static Age 16 Hours | 260° C. (500° F.) Static Age 48 Hours | 260° C. (500° F.) Static Age 72 Hours | Initial | 260° C. (500° F.) Static Age 16 Hours |
| 600 rpm | >300 | >300 | >300 | 80 | 65 | 47 | 191 | 85 | 92 | 79 | 202 | 92 |
| 300 rpm | 242 | 249 | 238 | 46 | 32 | 25 | 100 | 50 | 41 | 41 | 106 | 56 |
| 200 rpm | 176 | 221 | 180 | 36 | 23 | 15 | 70 | 35 | 29 | 26 | 74 | 42 |
| 100 rpm | 105 | 183 | 113 | 25 | 14 | 9 | 40 | 21 | 16 | 14 | 41 | 27 |
| 6 rpm | 20 | 124 | 26 | 12 | 5 | 2 | 6 | 4 | 3 | 2 | 6 | 9 |
| 3 rpm | 16 | 122 | 22 | 12 | 4 | 1 | 4 | 4 | 2 | 1 | 4 | 9 |
| Plastic Viscosity, cP | NM | NM | NM | 34 | 33 | 22 | 91 | 35 | 51 | 38 | 96 | 36 |
| Yield Point, Pa (lb/100 ft²) | NM | NM | NM | 5.7 (12) | −0.48 (−1) | 1.4 (3) | 4.3 (9) | 7.2 (15) | −4.8 (−10) | 1.4 (3) | 4.8 (10) | 9.6 (20) |
| Gels, Pa (lb/100 ft²) | 9.6/18.2 (20/38) | 61/92.9 (127/194) | 14.4/28.3 (30/59) | 10/22.5 (21/47) | 3.8/11 (8/23) | 2.4/5.3 (5/11) | 2.9/4.3 (6/9) | 5.3/13.9 (11/29) | 2.9/11 (6/23) | 1.4/5.7 (3/12) | 2.9/3.8 (6/8) | 8.1/20.6 (17/43) |

-continued

| | | | | | | | | | | | | |
|---|---|---|---|---|---|---|---|---|---|---|---|---|
| API fluid loss, cm³/30 min | 1.5 | 2.3 | 1.7 | 1.6 | 2.6 | 2.6 | 1.8 | 2.8 | 2.5 | 2.2 | 1.8 | 2.4 |
| 177° C. (350° F.) HPHT filtrate, cm³/30 min | — | — | — | 14 | 15 | 20 | — | 20 | 23 | 16 | — | 16 |
| pH | 8.5 | 9.0 | 6.9 | 9.0 | 9.8 | 9.1 | 9.2 | 9.0 | 8.9 | 8.9 | 9.8 | 8.6 |
| Settling | | | | | None | | | | | | | |

After 16 hours of static aging at about 260° C. (500° F.), all of the Formulas exhibited an HPHT filtrate of less than 25 cm³/min after 30 minutes at about 177° C. (350° F.). The result was believed to be attributable, at least in part, to the selection of polymer having desirable properties. Although not measured in this Example, one desirable property for the water soluble polymer is a 5% by weight Brookfield viscosity in freshwater of from about 50 cP to about 100 cP.

EXAMPLE 8

In the following test, the drilling fluid system had the following general formula, where the water soluble polymer was (D) 50:37.5:12.5 mole % acrylamide:AMPS:acrylate or (A) 10 mole % AMPS polymerized with acrylamide. The formulas and the results are given in the following Table:

| | Formulation | | | |
|---|---|---|---|---|
| | 29 | 30 | 31 | 32 |
| | Experimental Water Soluble Polymer | | | |
| | D | D | A | A |
| Freshwater, ml(bbl) | 196 (0.56) | 196 (0.56) | 196 (0.56) | 196 (0.56) |
| MIL-GEL ™, kg(lb) | 2.3 (4.0) | 1.1 (2.5) | 2.3 (4.0) | 2.3 (4.0) |
| MIL-TEMP ®, kg(lb) | 1.1 (2.5) | 1.1 (2.5) | 0.9 (2.0) | 0.9 (2.0) |
| CHEM-TROL ® X, kg(lb) | 2.3 (5.0) | 2.3 (5.0) | 2.3 (5.0) | 2.3 (5.0) |
| Caustic soda, kg(lb) | 0.23 (0.5) | 0.23 (0.5) | 0.23 (0.5) | 0.23 (0.5) |
| KEM-SEAL ® PLUS, kg(lb) | 0.23 (0.5) | 0.23 (0.5) | 0.5 (1.0) | 0.5 (1.0) |
| Experimental Water Soluble Polymer, kg(lb) | 0.9 (2.0) | 0.9 (2.0) | 0.9 (2.0) | 0.9 (2.0) |
| POLYDRILL ™, kg(lb) | 3.2 (7.0) | 3.2 (7.0) | 3.2 (7.0) | 3.2 (7.0) |
| MIL-CARB ®, kg(lb) | 4.5 (10) | 4.5 (10) | 4.5 (10) | 4.5 (10) |
| MIL-BAR ®, kg(lb) | 248.4 (547.7) | 248.4 (547.7) | 248.4 (547.7) | 248.4 (547.7) |

| | Formulation | | | | | | | |
|---|---|---|---|---|---|---|---|---|
| | 29 | | 30 | | 31 | | 32 | |
| | FLUID PROPERTIES Fann 35 at 49° C. (120° F.) | | | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | 117 | 89 | 104 | 81 | 235 | 100 | 205 | 103 |
| 300 rpm | 62 | 58 | 56 | 50 | 132 | 55 | 115 | 58 |
| 200 rpm | 45 | 46 | 39 | 39 | 94 | 41 | 81 | 44 |
| 100 rpm | 25 | 34 | 22 | 26 | 54 | 24 | 46 | 29 |
| 6 rpm | 4 | 18 | 3 | 13 | 8 | 5 | 7 | 10 |
| 3 rpm | 3 | 16 | 2 | 11 | 6 | 4 | 5 | 8 |
| Plastic Viscosity, Cp | 55 | 31 | 48 | 31 | 103 | 45 | 90 | 45 |
| Yield Point, | 3.4 | 12.9 | 3.8 | 9.1 | 13.9 | 4.8 | 12 | 6.2 |

-continued

| | | | | | | | | |
|---|---|---|---|---|---|---|---|---|
| Pa (lb/100 ft²) | (7) | (27) | (8) | (19) | (29) | (10) | (25) | (13) |
| Gels, Pa (lb/100 ft²) | 2.4/3.8 (5/8) | 12.4/26.8 (26/56) | 1.4/2.9 (3/6) | 7.7/16.3 (16/34) | 3.4/4.8 (7/10) | 3.8/13 (8/27) | 3.8/5.7 (8/12) | 7.7/27.3 (16/57) |
| API fluid loss, cm³/30 min | 1.5 | 2.8 | 2.5 | 3.0 | 1.2 | 2.2 | 1.8 | 2.2 |
| 177° C. (350° F.) HPHT filtrate, cm³/30 min | — | 16 | — | 17 | — | 23 | — | 24 |
| pH | 9.8 | 8.9 | 9.8 | 9.0 | 9.9 | 8.9 | 9.4 | 8.9 |
| Settling | | | | | | | | |

After 16 hours of static aging at about 260° C. (500° F.), all of the Formulas exhibited an HPHT filtrate of less than 25 cm³/min after 30 minutes at about 177° C. (350° F.). The result was believed to be attributable, at least in part, to the selection of polymer having desirable properties.

EXAMPLE 9

In the following test, the drilling fluid system had the following general formula, where the water soluble polymer was (A) 10 mole % AMPS polymerized with acrylamide; (C) 40 mole % AMPS polymerized with acrylamide; or (F) 90 weight percent NaAMPS (AMPS, sodium salt)/10 weight percent N,N-dimethylacrylamide. The formulas and the results are given in the following Table:

| | Formulation | | | | |
|---|---|---|---|---|---|
| | 33 | 34 | 35 | 36 | 37 |
| | Experimental Water Soluble Polymer | | | | |
| | A | C | F | F | A |
| Freshwater, ml(bbl) | 196 (0.56) | 196 (0.56) | 196 (0.56) | 196 (0.56) | 196 (0.56) |
| MIL-GEL ™, kg (lb) | 2.3 (4.0) | 2.3 (4.0) | 2.3 (4.0) | 2.3 (4.0) | 2.3 (4.0) |
| MIL-TEMP ®, kg (lb) | 0.9 (2.0) | 0.9 (2.0) | 0.9 (2.0) | 0.9 (2.0) | †0.9 (2.0) (ALL-TEMP) |
| CHEM-TROL ® X, kg (lb) | 2.3 (5.0) | 2.3 (5.0) | 2.3 (5.0) | 2.3 (5.0) | 2.3 (5.0) |
| Caustic soda, kg (lb) | 0.23 (0.5) | 0.23 (0.5) | 0.23 (0.5) | 0.23 (0.5) | 0.23 (0.5) |
| KEM-SEAL ® PLUS, lb | 0.5 (1.0) | 0.5 (1.0) | — | — | 0.5 (1.0) |
| Experimental Water Soluble Polymer, kg (lb) | 0.9 (2.0) | 0.9 (2.0) | — | — | 0.9 (2.0) |
| KEM-SEAL ® PLUS Experimental, kg (lb) | — | — | 1.4 (3.0) | 1.4 (3.0) | — |
| POLYDRILL ™, kg (lb) | 3.2 (7.0) | 3.2 (7.0) | 3.2 (7.0) | 3.2 (7.0) | 3.2 (7.0) |
| MIL-CARB ®, kg (lb) | 4.5 (10) | 4.5 (10) | 4.5 (10) | 4.5 (10) | 4.5(10) |
| MIL-BAR ®, kg (lb) | 248.4 (547.7) | 248.4 (547.7) | 248.4 (547.7) | 248.4 (547.7) | 248.4 (547.7) |

-continued

| | Formulation | | | | | | | | | |
|---|---|---|---|---|---|---|---|---|---|---|
| | 33 | | 34 | | 35 | | 36 | | 37 | |
| | FLUID PROPERTIES Fann 35 at 49° C. (120° F.) | | | | | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | 166 | 91 | 153 | 96 | 230 | 218 | 197 | 235 | 254 | 118 |
| 300 rpm | 93 | 51 | 85 | 61 | 131 | 176 | 111 | 191 | 144 | 72 |
| 200 rpm | 67 | 37 | 61 | 48 | 94 | 161 | 81 | 176 | 103 | 56 |
| 100 rpm | 38 | 24 | 35 | 34 | 54 | 138 | 46 | 151 | 59 | 37 |
| 6 rpm | 7 | 6 | 6 | 11 | 9 | 104 | 7 | 115 | 9 | 10 |
| 3 rpm | 5 | 4 | 4 | 9 | 6 | 103 | 5 | 110 | 6 | 8 |
| Plastic Viscosity, cP | 73 | 40 | 68 | 35 | 99 | 42 | 86 | 44 | 110 | 46 |
| Yield Point, Pa (lb/100 ft$^2$) | 9.6 (20) | 5.3 (11) | 8.1 (17) | 12.4 (26) | 14.8 (32) | 64.2 (134) | 12 (25) | 70.4 (147) | 16.3 (34) | 12.4 (26) |
| Gels, Pa (lb/100 ft$^2$) | 3.4/5 (7/10) | 5.2/18.2 (11/38) | 2.9/4.3 (6/9) | 10/28.2 (21/59) | 3.8/5.7 (8/12) | 55/76 (115/159) | 3.4/4.8 (7/10) | 60/84 (125/176) | 3.8/5.7 (8/12) | 9.6/29 (20/62) |
| API fluid loss, cm$^3$/30 min | 1.8 | 2.0 | 1.5 | 2.5 | 1.4 | 2.6 | 1.4 | 3.2 | 1.0 | 2.1 |
| 149° C. (300° F.) HPHT filtrate, cm$^3$/30 min | — | 44 | — | 49 | — | 54 (13 min) | — | 52 | — | 26 |
| pH | 9.5 | 8.8 | 9.5 | 8.8 | 9.2 | 9.0 | 9.4 | 9.1 | 9.5 | 8.9 |

*20% mole weight AMPS, **40% mole weight AMPS
* & **lower molecular weight version of KEM-SEAL PLUS
†substituted MIL-TEMP with ALL-TEMP to check compatibility After 16 hours of static aging at about 260° C. (500° F.), all of the Formulas for which a measurement was taken exhibited an HPHT filtrate of greater than 25 cm$^3$/min after 30 minutes or less at about 149° C. (300° F.). Formula 37, the 10 mole % AMPS polymerized with acrylamide (A) exhibited a HPHT filtrate of 26 cm$^3$/min after 30 minutes or less at about 149° C. (300° F.). The result was believed to be attributable to variability among commercially available polymers and a lack of synergistic benefits of both experimental polymers and KEMSEAL® PLUS.

EXAMPLE 10

In the following test, the drilling fluid system had the following general formula, where the water soluble polymer was (A) 10 mole % AMPS polymerized with acrylamide. The formulas and the results are given in the following Table:

| | Form. | | | | | |
|---|---|---|---|---|---|---|
| | 40 | 41 | 42 | 43 | 44 | 45 |
| | Experiimental Water Soluble Polymer | | | | | |
| | A | A | A | A | A | A |
| Freshwater, ml(bbl) | 196 (0.56) | 196 (0.56) | 196 (0.56) | 196 (0.56) | 196 (0.56) | 196 (0.56) |
| MIL-GEL ™, kg (lb) | 2.3 (4.0) | 2.3 (4.0) | 2.3 (4.0) | 2.3 (4.0) | 2.3 (4.0) | 2.3 (4.0) |
| MIL-TEMP ®, kg (lb) | 0.9 (2.0) | 0.9 (2.0) | 0.9 (2.0) | 0.9 (2.0) | 0.9 (2.0) | 0.9 (2.0) |
| CHEM-TROL ® X, kg (lb) | 2.3 (5.0) | 2.3 (5.0) | 2.3 (5.0) | 2.3 (5.0) | 2.3 (5.0) | 2.3 (5.0) |
| Caustic soda, kg (lb) | 0.23 (0.5) | 0.23 (0.5) | 0.23 (0.5) | 0.23 (0.5) | 0.23 (0.5) | 0.23 (0.5) |
| KEM-SEAL ®® PLUS, kg (lb) | 0.5 (1.0) | 0.5 (1.0) | 0.5 (1.0) | 0.5 (1.0) | 0.5 (1.0) | 0.5 (1.0) |

-continued

|  | | | | | | |
|---|---|---|---|---|---|---|
| Experiimental Water Soluble Polymer, kg (lb) | 0.9 (2.0) | 0.9 (2.0) | 0.9 (2.0) | 0.9 (2.0) | 0.9 (2.0) | 0.9 (2.0) |
| POLY-DRILL ™, kg (lb) | 3.2 (7.0) | 3.2 (7.0) | 3.2 (7.0) | 3.2 (7.0) | 3.2 (7.0) | 3.2 (7.0) |
| MIL-CARB ®, kg (lb) | 4.5 (10) | 4.5 (10) | 4.5 (10) | 4.5 (10) | 4.5 (10) | 4.5 (10) |
| MIL-BAR ®, kg (lb) | 248.4 (547.7) | 248.4 (547.7) | 248.4 (547.7) | 248.4 (547.7) | 248.4 (547.7) | 248.4 (547.7) |
| Add 10% NaCl, 1(bbl) | — | 15.8 (0.1) | 15.8 (0.1) | 15.8 (0.1) | 15.8 (0.1) | 15.8 (0.1) |
| MAX-TROL ®, kg (lb) | — | — | 2.3 (5.0) | 4.5 (10) | — | — |
| SOLTEX ®, kg (lb) | — | — | — | — | 10 | — |
| SULFA-TROL ®, kg)lb) | — | — | — | — | — | 10 |

| | Form. | | | | | | | | | | |
|---|---|---|---|---|---|---|---|---|---|---|---|
| | 40 | | 41 | | 42 | | 43 | | 44 | | 45 |
| | FLUID PROPERTIES Fann 35 at 49° C. (120° F.) | | | | | | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | 235 | 100 | 134 | 70 | 156 | 83 | | 165 | | 73 | | 75 |
| 300 rpm | 132 | 55 | 74 | 42 | 87 | 54 | | 113 | | 46 | | 53 |
| 200 rpm | 94 | 41 | 52 | 34 | 62 | 45 | | 92 | | 36 | | 42 |
| 100 rpm | 54 | 24 | 30 | 26 | 36 | 32 | | 65 | | 28 | | 33 |
| 6 rpm | 8 | 5 | 4 | 13 | 4 | 15 | | 22 | | 18 | | 21 |
| 3 rpm | 6 | 4 | 3 | 11 | 2 | 12 | | 21 | | 16 | | 19 |
| Plastic Viscosity, cP | 103 | 45 | 60 | 28 | 69 | 29 | | 52 | | 27 | | 22 |
| Yield Point, Pa (lb/100 ft$^2$) | 13.4 (29) | 4.8 (10) | 6.7 (14) | 6.7 (14) | 8.6 (18) | 12 (25) | | 29.2 (61) | | 0.1 (19) | | 14.8 (31) |
| Gels, Pa (lb/100 ft$^2$) | 3.4/4.8 (7/10) | 3.8/13 (8/27) | 2.4/4.3 (5/9) | 10.5/27.3 (22/57) | 2.4/6.7 (5/14) | 10/23 (21/48) | | 14.4/26.8 (30/56) | | 11/23 (23/48) | | 13.9/27.3 (29/57) |
| API fluid loss, cm$^3$/30 min | 1.2 | 2.2 | 1.2 | 3.0 | 0.9 | 2.8 | | 7.8 | | 2.4 | | 3.0 |
| 177° C. (350° F.) HPHT filtrate, cm$^3$/30 min | — | 23 | — | NC | — | >100 | | NC | | NC | | 48 |
| Ph | 9.9 | 8.9 | 9.1 | 8.5 | 9.0 | 8.5 | | 8.5 | | 8.5 | | 8.5 |
| Settling | | | | | | | | | | | | |

After 16 hours of static aging at about 260° C. (500° F.), Formula 40 exhibited an HPHT filtrate of less than 25 cm$^3$/min after 30 minutes at about 177° C. (350° F.). The remaining Formulas that were tested exhibited an HPHT filtrate of greater than 25 cm$^3$/min after 30 minutes or less at about 177° C. (350° F.). The result was believed to be attributable to deleterious effects of salt to the base fluid. Only Formula 45, which included 10 lb/bbl SULFA-TROL®, exhibited restoration of HPHT filtration control.

EXAMPLE 12

In the following test, the drilling fluid system had the following general formula, where the water soluble polymer was (A) 10 mole % AMPS polymerized with acrylamide. The formulas and the results are given in the following Table:

| | Form. | | | | | |
|---|---|---|---|---|---|---|
| | 46 | 47 | 48 | 49 | 50 (repeat #40)] | 51 [(re-mix) # 50] |
| | | | Experiimental Water Soluble Polymer | | | |
| | A | A | A | A | A | A |
| Fresh-water, ml(bbl) | 196 (0.56) | 196 (0.56) | 196 (0.56) | 196 (0.56) | 196 (0.56) | 196 (0.56) |
| MIL-GEL™, kg (lb) | 2.3 (4.0) | 2.3 (4.0) | 2.3 (4.0) | 2.3 (4.0) | 2.3 (4.0) | 2.3 (4.0) |
| MIL-TEMP®, kg (lb) | 0.9 (2.0) | 0.9 (2.0) | 0.9 (2.0) | 0.9 (2.0) | 0.9 (2.0) | 0.9 (2.0) |
| CHEM-TROL® X, kg (lb) | 2.3 (5.0) | 2.3 (5.0) | 2.3 (5.0) | 2.3 (5.0) | 2.3 (5.0) | 2.3 (5.0) |
| Caustic soda, kg (lb) | 0.23 (0.5) | 0.23 (0.5) | 0.23 (0.5) | 0.23 (0.5) | 0.23 (0.5) | 0.23 (0.5) |
| KEM-SEAL® PLUS, kg (lb) | 0.5 (1.0) | 0.5 (1.0) | 0.5 (1.0) | 0.5 (1.0) | 0.5 (1.0) | 0.5 (1.0) |
| Experiimental Water Soluble Polymer, kg (lb) | 0.9 (2.0) | 0.9 (2.0) | 0.9 (2.0) | 0.9 (2.0) | 0.9 (2.0) | 0.9 (2.0) |
| POLY-DRILL™, kg (lb) | 3.2 (7.0) | 3.2 (7.0) | 3.2 (7.0) | 3.2 (7.0) | 3.2 (7.0) | 3.2 (7.0) |
| MIL-CARB®, kg (lb) | 4.5 (10) | 4.5 (10) | 4.5 (10) | 4.5 (10) | 4.5 (10) | 4.5 (10) |
| MIL-BAR®, kg (lb) | 248.4 (547.7) | 248.4 (547.7) | 248.4 (547.7) | 248.4 (547.7) | 248.4 (547.7) | 248.4 (547.7) |
| Add 10% NaCl, 1(bbl) | 15.8 (0.1) | 15.8 (0.1) | 15.8 (0.1) | 15.8 (0.1) | — | — |
| SULFA-TROL®, kg (lb) | — | 2.3 (5.0) | 4.5 (10) | — | — | — |
| PROTECTO-MAGIC™, kg (lb) | 4.5 (10) | 2.3 (5.0) | — | — | — | — |
| CHEK-LOSS® PLUS, kg)lb) | — | — | 4.5 (10) | — | — | — |
| Bore-Drill, kg (lb) | — | — | — | 4.5 (10) | — | — |

| | Form. | | | | | | | | | | | |
|---|---|---|---|---|---|---|---|---|---|---|---|---|
| | | | | | | | | | 50 | | 51 | |
| | FLUID PROPERTIES Fann 35 at 49° C. (120° F.) | | | | | | | | | | | |
| | 260° C. (500° F.) Static Age 16 | | 260° C. (500° F.) Static Age 16 | | 260° C. (500° F.) Static Age 16 | | 260° C. (500° F.) Static Age 16 | | 260° C. (500° F.) Static Age 16 | | 260° C. (500° F.) Static Age 16 | |
| | Initial | Hours | Initial | Hours | Initial | Hours | Initial | Hours | Initial | Hours | Initial | Hours |
| 600 rpm | | 126 | | 81 | | 111 | | Cannot | 260 | 100 | 247 | 73 |
| 300 rpm | | 93 | | 57 | | 77 | | Stir | 140 | 52 | 137 | 39 |
| 200 rpm | | 81 | | 48 | | 70 | | Down | 105 | 36 | 98 | 26 |
| 100 rpm | | 66 | | 37 | | 58 | | | 58 | 20 | 56 | 14 |
| 6 rpm | | 49 | | 25 | | 40 | | | 8 | 3 | 8 | 2 |
| 3 rpm | | 47 | | 23 | | 39 | | | 6 | 2 | 6 | 1 |
| Plastic Viscosity, cP | | 33 | | 24 | | 34 | | | 120 | 48 | 110 | 34 |
| Yield Point, Pa (lb/100 ft²) | | 28.7 (60) | | 11 (23) | | 20.6 (43) | | | 9.6 (20) | 1.9 (4) | 12.9 (27) | 2.4 (5) |
| Gels, Pa (lb/100 ft²) | | 24.9/36.4 (51/76) | | 15.8/33.5 (33/70) | | 27.3/52.7 (57/110) | | | 3.8/4.8 (8/10) | 1.4/11 (3/23) | 3.4/5.2 (7/11) | .96/6.7 (2/14) |
| API fluid loss, cm³/30 min | | 2.8 | | 2.8 | | 2.2 | | | 1.0 | 1.7 | 1.0 | 2.0 |

-continued

|  | | | | | | | |
|---|---|---|---|---|---|---|---|
| 177° C. (350° F.) HPHT filtrate, cm³/30 min | 62 | 80 | 80 | — | 44 | — | 46 |
| pH | 8.3 | 8.4 | 8.3 | 9.5 | 8.9 | 9.1 | 8.8 |

After 16 hours of static aging at about 260° C. (500° F.), all of the Formulas tested exhibited an HPHT filtrate of greater than 25 cm³/min after 30 minutes at about 177° C. (350° F.). The result was believed to be attributable to the deleterious effects of salt and variability among commercially available polymers. Testing with other commercially available additives did not restore HPHT filtration control.

EXAMPLE 13

In the following test, the drilling fluid system had the following general formula, where the water soluble polymer was (A) 10 mole % AMPS polymerized with acrylamide. The formulas and the results are given in the following Table:

| | Formulation | | | | | |
|---|---|---|---|---|---|---|
| | 52 | 53 | 54 | 55 | 56 | 57 |
| | | | Experimental Water Soluble Polymer | | | |
| | A | A | A | A | A | A |
| Freshwater, ml(bbl) | 196 (0.56) | 196 (0.56) | 196 (0.56) | 196 (0.56) | 196 (0.56) | 196 (0.56) |
| MIL-GEL ™, kg(lb) | 2.3 (4.0) | 2.3 (4.0) | 2.3 (4.0) | 2.3 (4.0) | 2.3 (4.0) | 2.3 (4.0) |
| MIL-TEMP ®, kg(lb) | 0.9 (2.0) | 0.9 (2.0) | 0.9 (2.0) | 0.9 (2.0) | 0.9 (2.0) | 0.9 (2.0) |
| CHEM-TROL ® X, kg(lb) | 2.3 (5.0) | 2.3 (5.0) | 2.3 (5.0) | 2.3 (5.0) | 2.3 (5.0) | 2.3 (5.0) |
| Caustic soda, kg(lb) | 0.23 (0.5) | 0.23 (0.5) | 0.23 (0.5) | 0.23 (0.5) | 0.23 (0.5) | 0.23 (0.5) |
| KEM-SEAL ® PLUS, kg(lb) | 0.5 (1.0) | 0.5 (1.0) | 0.5 (1.0) | 0.5 (1.0) | 0.5 (1.0) | 0.5 (1.0) |
| Experimental Water Soluble Polymer, kg(lb) | 0.9 (2.0) | 0.9 (2.0) | 0.9 (2.0) | 0.9 (2.0) | 0.9 (2.0) | 0.9 (2.0) |
| POLY-DRILL ™, kg(lb) | 3.2 (7.0) | 3.2 (7.0) | 3.2 (7.0) | 3.2 (7.0) | 3.2 (7.0) | 3.2 (7.0) |
| MIL-CARB ®, kg(lb) | 4.5 (10) | 4.5 (10) | 4.5 (10) | 4.5 (10) | 4.5 (10) | 4.5 (10) |
| MIL-BAR ®, kg(lb) | 248.4 (547.7) | 248.4 (547.7) | 248.4 (547.7) | 248.4 (547.7) | 248.4 (547.7) | 248.4 547.7 |
| Add 10% NaCl, l(bbl) | 15.8 (0.1) | 15.8 (0.1) | — | — | — | — |
| SULFA-TROL ®, kg(lb) | — | 5 | — | — | — | — |
| BORE-DRILL ™, kg(lb) | 2.3 (5) | 2.3 (5) | — | — | — | — |

| | Form. | | | | | | | | | | |
|---|---|---|---|---|---|---|---|---|---|---|---|
| | 52 | | 53 | | 54 | | 55 | | 56 | | 57 |
| | | | | FLUID PROPERTIES Fann 35 at 49° C.(120° F.) | | | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | | 197 | | 227 | 274 | 93 | 192 | 125 | 189 | 110 | 174 | 103 |
| 300 rpm | | 140 | | 160 | 153 | 52 | 103 | 65 | 104 | 58 | 95 | 57 |

-continued

| | | | | | | | | | |
|---|---|---|---|---|---|---|---|---|---|
| 200 rpm | 116 | 136 | 110 | 38 | 72 | 47 | 75 | 42 | 67 | 41 |
| 100 rpm | 87 | 100 | 62 | 22 | 41 | 28 | 42 | 24 | 38 | 24 |
| 6 rpm | 40 | 43 | 8 | 4 | 7 | 9 | 7 | 5 | 6 | 5 |
| 3 rpm | 35 | 40 | 6 | 3 | 5 | 7 | 5 | 3 | 4 | 3 |
| Plastic Viscosity, Cp | 37 | 67 | 121 | 41 | 89 | 60 | 85 | 52 | 79 | 46 |
| Yield Point, Pa (lb/100 ft$^2$) | 49.3 (103) | 44.5 (93) | 15.3 (32) | 5.3 (11) | 6.7 (14) | 2.4 (5) | 9.1 (19) | 2.9 (6) | 7.7 (16) | 5.3 (11) |
| Gels, Pa (lb/100 ft$^2$) | 23/43.6 (48/91) | 24.4/49.8 (51/104) | 3.4/5.7 (7/12) | 3.4/13.4 (7/28) | 2.9/5.3 (6/11) | 8.1/25.9 (17/54) | 2.9/4.8 (6/10) | 3.8/15.8 (8/33) | 2.9/4.3 (6/9) | 4.9/20.1 (10/42) |
| API fluid loss, cm$^3$/30 min | 3.8 | 5.4 | 1.4 | 2.0 | 1.2 | 2.4 | 1.0 | 2.2 | 1.2 | 2.2 |
| 177° C. (350° F.) HPHT filtrate, cm$^3$/30 min | — | — | — | 50 | — | 38 | — | 28 | — | 40 |
| pH | 8.2 | 8.5 | 9.6 | 8.7 | 9.7 | 8.7 | 9.7 | 8.7 | 9.8 | 8.8 |
| Settling | | | | | | | | | | |

After 16 hours of static aging at about 260° C. (500° F.), all of the Formulas tested exhibited an HPHT filtrate of greater than 25 cm$^3$/min after 30 minutes at about 177° C. (350° F.). The result was believed to be attributable, at least in part, to variability among commercially available polymers.

EXAMPLE 14

In the following test, the drilling fluid system had the following general formula, where the water soluble polymer was (A) 10 mole % AMPS polymerized with acrylamide. The formulas and the results are given in the following Table:

| | Formulation | | |
|---|---|---|---|
| | 58 | 59 | 60 |
| | Experimental Water Soluble Polymer | | |
| | A | A | A |
| Freshwater, ml(bbl) | 196 (0.56) | 196 (0.56) | 196 (0.56) |
| MIL-GEL ™, kg(lb) | 2.3 (4.0) | 2.3 (4.0) | 2.3 (4.0) |
| MIL-TEMP ®, kg(lb) | 0.9 (2.0) | 0.9 (2.0) | 0.9 (2.0) |
| CHEM-TROL ® X, kg(lb) | 2.3 (5.0) | 2.3 (5.0) | 2.3 (5.0) |
| Caustic soda, kg(lb) | 0.23 (0.5) | 0.23 (0.5) | 0.23 (0.5) |
| KEM-SEAL ®PLUS, kg(lb) | 0.5 (1.0) | 0.5 (1.0) | 0.5 (1.0) |
| Experimental Water Soluble Polymer, kg(lb) | 2 | 2 | 2 |
| POLYDRILL ™, kg(lb) | 3.2 (7.0) | 3.2 (7.0) | 3.2 (7.0) |
| MIL-CARB ®, kg(lb) | 4.5 (10) | 4.5 (10) | 4.5 (10) |
| MIL-BAR ®, kg(lb) | 248.4 (547.7) | 248.4 (547.7) | 248.4 (547.7) |
| 10% NaCl, l(bbl) | — | 15.8 (0.1) | 15.8 (0.1) |
| SULFA-TROL ®, kg(lb) | — | 4.5 (10) | — |
| POLYDRILL ™, kg(lb) | — | — | 4.5 (10) |

-continued

| | Formulation | | |
|---|---|---|---|
| | 58 | 59 | 60 |
| FLUID PROPERTIES Fann 35 at 49° C.(120° F.) | | | |
| | Initial | 260° C. (500° F.) Static Age 16 Hours | 260° C. (500° F.) Static Age 72 Hours | 260° C. (500° F.) Static Age 16 Hours | 260° C. (500° F.) Static Age 16 Hours |
| 600 rpm | 216 | 90 | 77 | 104 | 113 |
| 300 rpm | 120 | 51 | 45 | 76 | 84 |
| 200 rpm | 86 | 39 | 32 | 65 | 70 |
| 100 rpm | 48 | 24 | 19 | 52 | 58 |
| 6 rpm | 8 | 5 | 4 | 30 | 37 |
| 3 rpm | 5 | 4 | 3 | 29 | 35 |
| Plastic Viscosity, Cp | 96 | 39 | 32 | 28 | 29 |
| Yield Point, Pa(lb/100 ft$^2$) | 11.5 (24) | 5.7 (12) | 6.2 (13) | 23 (48) | 26.3 (55) |
| Gels, Pa (lb/100 ft$^2$) | 3.8/10.5 (8/22) | 4.8/20.1 (10/42) | 2.4/13.4 (5/28) | 19.6/38.3 (41/80) | 20.6/35.4 (43/74) |
| API fluid loss, cm$^3$/30 min | 1.6 | 2.4 | 2.4 | 2.4 | 2.0 |
| 177° C.(350° F.) HPHT filtrate, cm$^3$/30 min | — | 34 | 20 | 24 | NC |
| pH | 9.6 | 8.7 | 8.5 | 8.3 | 8.3 |

After 16 hours of static aging at about 260° C. (500° F.), Formulas 58 (no added NaCl) and 59 (10 lb/bbl SULFA-TROL® and added NaCl) exhibited an HPHT filtrate of less than 25 cm$^3$/min after 30 minutes at about 177° C. (350° F.). Formula 60, which contained added NaCl, but not SULFA-TROL®, exhibited an HPHT filtrate of greater than 25 cm$^3$/min after 30 minutes at about 177° C. (350° F.).

EXAMPLE 15

In the following test, the drilling fluid system had the following general formula, where the water soluble polymer was (A) 10 mole % AMPS polymerized with acrylamide. The formulas and the results are given in the following Table:

| | Formulation | | | | | |
|---|---|---|---|---|---|---|
| | 61 | 62 | 63 | 64 | 65 | 66 |
| | | Experimental Water Soluble Polymer | | | | |
| | A | **16-hr aged sample | A | A | A | A |
| Freshwater, ml(bbl) | 196 (0.56) | | 196 (0.56) | 196 (0.56) | 196 (0.56) | 196 (0.56) |
| MIL-GEL ™, kg(lb) | 2.3 (4.0) | | 2.3 (4.0) | 2.3 (4.0) | 2.3 (4.0) | 2.3 (4.0) |
| MIL-TEMP ®, kg(lb) | 0.9 (2.0) | | 0.9 (2.0) | 0.9 (2.0) | 0.9 (2.0) | 0.9 (2..0) |
| CHEM-TROL ® X, kg(lb) | 2.3 (5.0) | | 2.3 (5.0) | 2.3 (5.0) | 2.3 (5.0) | 2.3 (5.0) |
| Caustic soda, kg(lb) | 0.23 (0.5) | | 0.23 (0.5) | 0.23 (0.5) | 0.23 (0.5) | 0.23 (0.5) |
| KEM-SEAL ®® PLUS, kg(lb) | 0.5 (1.0) | | 0.5 (1.0) | 0.5 (1.0) | 0.5 (1.0) | 0.5 (1.0) |
| Experimental Water Soluble Polymer, kg(lb) | 0.9 (2) | | 0.9 (2) | 0.9 (2) | 0.9 (2) | 0.9 (2) |
| POLYDRILL ™, kg(lb) | 3.2 (7.0) | | 3.2 (7.0) | 3.2 (7.0) | 3.2 (7.0) | 3.2 (7.0) |
| MIL-CARB ®, kg(lb) | 4.5 (10) | | 4.5 (10) | 4.5 (10) | 4.5 (10) | 4.5 (10) |
| MIL-BAR, kg(lb) | 248.4 (547.7) | | 248.4 (547.7) | 248.4 (547.7) | 248.4 (547.7) | 248.4 (547.7) |
| 10% NaCl ®, l(bbl) | — | 15.8 (0.1) | 15.8 (0.1) | 15.8 (0.1) | 15.8 (0.1) | 15.8 (0.1) |
| SULFA-TROL ®, kg(lb) | — | 4.5 (10) | 4.5 (10) | | 2.3 (5.0) | 2.3 (5.0) |
| POLYDRILL ™, kg(lb) | — | | — | 4.5 (10) | — | |
| PROTECTO-MAGIC, kg(lb) | — | | — | | — | 2.3 (5.0) |
| Caustic soda, kg(lb | — | 0.23 (0.5) | — | — | — | — |

| | Form. | | | | | |
|---|---|---|---|---|---|---|
| | 61 | 62 | 63 | 64 | 65 | 66 |
| | FLUID PROPERTIES Fann 35 at 149° C. (120° F.) | | | | | |
| | Initial | 260° C. (500° F.) Static Age 16 Hours | 260° C. (500° F.) Static Age 72 Hours | 260° C. (500° F.) Static Age 16 Hours | 260° C. (500° F.) Static Age 16 Hours | 260° C. (500° F.) Static Age 16 Hours | 260° C. (500° F.) Static Age 16 Hours |
| 600 rpm | 216 | 90 | 77 | 133 | 104 | 113 | 116 | 143 |
| 300 rpm | 120 | 51 | 45 | 103 | 76 | 84 | 85 | 110 |
| 200 rpm | 86 | 39 | 32 | 92 | 65 | 70 | 75 | 98 |
| 100 rpm | 48 | 24 | 19 | 77 | 52 | 58 | 60 | 84 |
| 6 rpm | 8 | 5 | 4 | 55 | 30 | 37 | 40 | 60 |
| 3 rpm | 5 | 4 | 3 | 52 | 29 | 35 | 37 | 57 |
| Plastic Viscosity, cP | 96 | 39 | 32 | 30 | 28 | 29 | 31 | 33 |
| Yield Point, Pa (lb/100 ft$^2$) | 11.5 (24) | 5.7 (12) | 6.2 (13) | 35 (73) | 23 (48) | 26.3 (55) | 25.9 (54) | 36.9 (77) |
| Gels, Pa (lb/100 ft$^2$) | 3.8/10.5 (8/22) | 4.8/20.1 (10/42) | 2.4/13.4 (5/28) | 29.6/49.3 (62/103) | 19.6/38.3 (41/80) | 20.6/35.4 (43/74) | 24/49.8 (50/104) | 32.6/55 (68/115) |
| API fluid loss, cm$^3$/30 min | 1.6 | 2.4 | 2.4 | 2.0 | 2.4 | 2.0 | 2.8 | 3.0 |
| 177° C.(350° F.) HPHT filtrate, cm$^3$/30 min | — | 34 | 20 | 22 | 24 | NC | >100 | 86 |
| Ph | 9.6 | 8.7 | 8.5 | 8.5 | 8.3 | 8.3 | 8.4 | 8.3 |

**16-hr aged sample was sample 61, which was already aged at 500° F. for 16 hours, and then was contaminated with 10% by vol. 10% NaCl brine, followed with 10 lb/bbl SULFA-TROL ® and 0.23(0.5) lb/bbl caustic soda After 16 hours of static aging at about 260° C. (500° F.), Formula 63 and reaged Formula 62, which contained both NaCl and SULFA-TROL®, exhibited an HPHT filtrate of less than 25 cm³/min after 30 minutes at about 177° C. (350° F.). The remainder of the formulas exhibited an HPHT filtrate of greater than 25 cm³/min after 30 minutes or less at about 177° C. (350° F.).

EXAMPLE 16

In the following test, the drilling fluid system had the following general formula, where the water soluble polymer was (A) 10 mole % AMPS polymerized with acrylamide. The formulas and the results are given in the following Table:

| | Form. 67 | Form. 68 | Form. 69 | Form. 70 | Form. 71 | Form. 72 |
|---|---|---|---|---|---|---|
| | \multicolumn{6}{c}{Experimental Water Soluble Polymer} | | | | | |
| | A | A | A | A | A | A |
| Freshwater, ml(bbl) | 196 (0.56) | 196 (0.56) | 196 (0.56) | 196 (0.56) | 196 (0.56) | 196 (0.56) |
| MIL-GEL™, kg(lb) | 2.3 (4.0) | 2.3 (4.0) | 2.3 (4.0) | 2.3 (4.0) | 2.3 (4.0) | 2.3 (4.0) |
| MIL-TEMP®, kg(lb) | 0.9 (2.0) | 0.9 (2.0) | 0.9 (2.0) | 0.9 (2.0) | 0.9 (2.0) | 0.9 (2.0) |
| CHEM-TROL® X, kg(lb) | 2.3 (5.0) | 2.3 (5.0) | 2.3 (5.0) | 2.3 (5.0) | 2.3 (5.0) | 2.3 (5.0) |
| Caustic soda, kg(lb) | 0.23 (0.5) | 0.23 (0.5) | 0.23 (0.5) | 0.23 (0.5) | 0.23 (0.5) | 0.23 (0.5) |
| KEM-SEAL® PLUS, kg(lb) | 0.5 (1.0) | 0.5 (1.0) | 0.5 (1.0) | 0.5 (1.0) | 0.5 (1.0) | 0.5 (1.0) |
| Experimental Water Soluble Polymer, kg(lb) | 0.9 (2) | 0.9 (2) | 0.9 (2) | 0.9 (2) | 0.9 (2.0) | 2.3 (4.0) |
| POLY-DRILL™, (kg/lb) | 3.2 (7.0) | 3.2 (7.0) | 3.2 (7.0) | 3.2 (7.0) | 3.2 (7.0) | 3.2 (7.0) |
| MIL-CARB®, kg(lb) | 4.5 (10) | 4.5 (10) | 4.5 (10) | 4.5 (10) | 4.5 (10) | 4.5 (10) |
| MIL-BAR®, kg(lb) | 248.4 (547.7) | 248.4 (547.7) | 248.4 (547.7) | 248.4 (547.7) | 248.4 (547.7) | 248.4 (547.7) |
| 10% NaCl, l(bbl) | — | 15.8 (0.1) | 15.8 (0.1) | 15.8 (0.1) | — | — |
| SULFA-TROL®, kg(lb) | — | 4.5 (10) | — | — | — | — |
| MAX-TROL®, kg(lb) | — | — | 4.5 (10) | — | — | — |
| SOLTEX®, kg(lb) | — | — | — | 4.5 (10) | — | — |

| | Form. 67 | | Form. 68 | | Form. 69 | | Form. 70 | | Form. 71 | | Form. 72 | |
|---|---|---|---|---|---|---|---|---|---|---|---|---|
| | \multicolumn{12}{c}{FLUID PROPERTIES Fann 35 at 49° C.(120° F.)} | | | | | | | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | 182 | | | 102 | | 220 | | 101 | >300 | 77 | 264 | 70 |
| 300 rpm | 99 | | | 72 | | 159 | | 75 | >300 | 36 | 145 | 40 |
| 200 rpm | 70 | | | 60 | | 134 | | 64 | 224 | 22 | 103 | 31 |
| 100 rpm | 39 | | | 48 | | 103 | | 52 | 131 | 12 | 58 | 19 |
| 6 rpm | 6 | | | 30 | | 48 | | 33 | 21 | 2 | 9 | 7 |
| 3 rpm | 4 | | | 27 | | 42 | | 31 | 17 | 1 | 6 | 6 |
| Plastic Viscosity, Cp | 83 | | | 30 | | 61 | | 26 | NM | 41 | 119 | 30 |
| Yield Point, Pa (lb/100 ft²) | 7.7 (16) | | | 20.1 (42) | | 46.9 (98) | | 23.5 (49) | NM | 0 (0) | 12.4 (26) | 4.8 (10) |

-continued

| | | | | | | | | |
|---|---|---|---|---|---|---|---|---|
| Gels, Pa (lb/100 ft$^2$) | 2.9/ 3.8 (6/8) | | 17.7/29.7 (37/62) | 27.3/43.6 (57/91) | 17.7/26.3 (37/55) | 9.6/16.3 (20/34) | 1.9/4.3 (4/9) | 3.8/8.6 (8/18) | 5.3/11.5 (11/24) |
| API fluid loss, cm$^3$/30 min | 1.5 | | 2.3 | 4.4 | 2.7 | 2.0 | 2.0 | 1.8 | 2.6 |
| 177° C.(350° F.) HHPT filtrate, cm$^3$/30 min | — | | 21 | 60 | >100 | — | 16 | — | 18 |
| pH | 9.8 | | 8.5 | 9.0 | 8.6 | 7.9 | 8.6 | 8.1 | 8.5 |

After 16 hours of static aging at about 260° C. (500° F.), the control (no added NaCl, Formulas 71 and 72) and Formula 68 (containing 10 lb.bbl SULFA-TROL®) exhibited an HPHT filtrate of less than 25 cm$^3$/min after 30 minutes at about 177° C. (350° F.). The remainder of the formulas exhibited an HPHT filtrate of greater than 25 cm$^3$/min after 30 minutes or less at about 177° C. (350® F.). This was true even though Formula 70 contained SOLTEX®, a sulfonated asphalt product. The result was believed to be attributable to the fact that SULFA-TROL® has a % lignite content. Lignite has limited solubility in saline water, which may account for improved HPHT filtration control compared with SOLTEX®. It is believed that the insoluble portion of the colloidal lignite will impart particle plugging onto the filter cake, thereby slowing down filtration. SOLTEX® apparently is too soluble to impart particle plugging.

In order to determine the differences between the two sulfonated asphalts, a measurement was made of "High pH Soluble but Low pH Insoluble" Materials for SOLTEX® and SULFA-TROL® Samples, as compared to LIGCO® (pure lignite)

| Samples | LIGCO® | SOLTEX® | SULFA-TROL® |
|---|---|---|---|
| % soluble at pH = 11 but insoluble at pH = 2.5 | 77% | 0.5% (test 1) 0.8% (test 2) | 28% (test 1) 25% (test 2) |
| % "Lignite" content* | 100% | 1% | 34% |

*Note: Calculated based on that lignite is 77% soluble at pH = 11.

EXAMPLE 17

In the following test, the drilling fluid system had the following general formula, where the water soluble polymer was (A) 10 mole % AMPS polymerized with acrylamide. Each of the formulations contained 10 lb/bbl SULFA-TROL®, with varying levels of NaCl. The formulas and the results are given in the following Table:

| | Formulation | | | |
|---|---|---|---|---|
| | 73 | 74 | 75 | 76 |
| | Experimental Water Soluble Polymer | | | |
| | A | A | A | A |
| Freshwater, ml(bbl) | 196 (0.56) | 196 (0.56) | 196 (0.56) | 196 (0.56) |
| MIL-GEL ™, kg(lb) | 2.3 (4.0) | 2.3 (4.0) | 2.3 (4.0) | 2.3 (4.0) |
| NaCl, kg(lb) | 1.8 (3.9) | 1.8 (3.9) | 3.6 (8.0) | 3.6 (8.0) |
| MIL-TEMP ®, kg(lb | 0.9 (2.0) | 0.9 (2.0) | 0.9 (2.0) | 0.9 (2.0) |
| CHEM-TROL ® X, kg(lb) | 2.3 (5.0) | 2.3 (5.0) | 2.3 (5.0) | 2.3 (5.0) |
| Caustic soda, kg(lb) | 0.23 (0.5) | 0.23 (0.5) | 0.23 (0.5) | 0.23 (0.5) |
| KEM-SEAL ® PLUS, kg(lb) | 0.5 (1.0) | 0.5 (1.0) | 0.5 (1.0) | 0.5 (1.0) |
| Experimental Water Soluble Polymer, kg(lb) | 0.9 (2.0) | — | 0.9 (2.0) | — |
| POLYDRILL ™, kg(lb) | 3.2 (7.0) | 3.2 (7.0) | 3.2 (7.0) | 3.2 (7.0) |
| MIL-CARB ®, kg(lb) | 4.5 (10) | 4.5 (10) | 4.5 (10) | 4.5 (10) |
| MIL-BAR ®, kg(lb) | 248.4 (547.7) | 248.4 (547.7) | 248.4 (547.7) | 248.4 (547.7) |
| SULFA-TROL ®, kg(lb) | 4.5 (10) | 4.5 (10) | 4.5 (10) | 4.5 (10) |

-continued

| | Formulation | | | | | | | |
|---|---|---|---|---|---|---|---|---|
| | 73 | | 74 | | 75 | | 76 | |
| | FLUID PROPERTIES Fann 35 at 49° C. (120° F.) | | | | | | | |
| | Initial | 260° C. (500° F.) Static Age 16 Hours | Initial | 260° C. (500° F.) Static Age 16 Hours | Initial | 260° C. (500° F.) Static Age 16 Hours | Initial | 260° C. (500° F.) Static Age 16 Hours |
| 600 rpm | 190 | 159 | 109 | 181 | 172 | 127 | 107 | 105 |
| 300 rpm | 104 | 113 | 62 | 142 | 95 | 87 | 60 | 80 |
| 200 rpm | 75 | 95 | 44 | 128 | 67 | 71 | 43 | 71 |
| 100 rpm | 42 | 74 | 26 | 109 | 38 | 55 | 26 | 59 |
| 6 rpm | 6 | 45 | 4 | 85 | 6 | 34 | 5 | 47 |
| 3 rpm | 4 | 42 | 3 | 82 | 3 | 31 | 4 | 44 |
| Plastic Viscosity, cP | 86 | 46 | 47 | 39 | 77 | 40 | 47 | 25 |
| Yield Point, Pa (lb/100 ft$^2$) | 8.6 (18) | 32 (67) | 7.2 (15) | 49.3 (103) | 8.6 (18) | 22.5 (47) | 6.2 (13) | 26.3 (55) |
| Gels, Pa (lb/100 ft$^2$) | 3.4/8.6 (7/18) | 25.4/39.3 (53/82) | 3.4/6.2 (7/13) | 3.4/47.4 (7/99) | 3.4/10 (7/21) | 18.7/29.6 (39/62) | 3.8/8.6 (8/18) | 20.6/33.5 (43/70) |
| API fluid loss, cm$^3$/30 min | 0.9 | 2.0 | 0.6 | 2.5 | 1.0 | 2.0 | 1.5 | 2.7 |
| 177° C. (350° F.) HPHT filtrate, cm$^3$/30 min | — | 19 | — | NC | — | NC | — | NC |
| Ph | 9.1 | 8.6 | 9.3 | 8.9 | 8.9 | 8.2 | 9.0 | 8.6 |

After 16 hours of static aging at about 260° C. (500° F.), the only formula tested that exhibited an HPHT filtrate of less than 25 cm$^3$/min after 30 minutes at about 177° C. (350° F.) was Formula 73, which contained 2 lb/bbl of the experimental water soluble polymer, 3.9 lb/bbl NaCl (or about 9000 ppm NaCl) and 10 lb/bbl SULFA-TROL®. Examples 75 and 76 contained 8.0 lb/bbl NaCl, or from about 18,000 to about 20,000 ppm NaCl, and Example 76 did not include the experimental water soluble polymer.

Persons of ordinary skill in the art will recognize that many modifications may be made to the foregoing without departing from the spirit and scope thereof. The embodiment described herein is meant to be illustrative only and should not be taken as limiting the invention, which is defined in the following claims.

We claim:

1. A drilling fluid system comprising:
    an aqueous base consisting essentially of freshwater;
    bridging agent comprising from about 0.7 to about 29 kg/m$^3$ (0.25 lb/bbl to about 10.0 lb/bbl) water soluble polymer having a 5% by weight Brookfield viscosity in freshwater of from about 50 cP to about 100 cP, said water soluble polymer comprising from about 10 to about 20 mole % monomer of acrylamide, from about 50 to about 60 mole % monomer of 2-acrylamido-2-methylpropane sulfonic acid or alkali metal salts thereof, and from about 25 to about 35 mole % N-vinyl pyrrolidone monomer; and,
    from about 21.42 to 57.15 kg/m$^3$ (7.5 to 20 lb/bbl) plugging agent comprising sulfonated asphalt and lignite;
    wherein, after 16 hours of static aging of the drilling fluid system at about 260° C. (500° F.), the drilling fluid system exhibits a HPHT filtrate of 25 cm$^3$/min or less after 30 minutes at about 149° C. (300° F.).

2. The drilling fluid system of claim 1 exhibiting a HPHT filtrate of 25 cm$^3$/min or less after 30 minutes at about 177° C. (350° F.).

3. The drilling fluid system of claim 1 exhibiting said HPHT filtrate at a content of 10,000 ppm or less monovalent salt and the plugging agent comprises from about 20 wt. % to about 30 wt. % lignite.

4. The drilling fluid system of claim 1 exhibiting said HPHT filtrate at a content of 9,000 ppm or less monovalent salt, wherein said amount of water soluble polymer is from about 2.8 to about 11.5 kg/m$^3$ (1 to about 4 lb/bbl).

5. The drilling fluid system of claim 1 wherein said water soluble polymer comprises:
    about 55 mole % 2-acrylamido-2-methylpropane sulfonic acid; and,
    about 30 mole % N-vinyl pyrrolidone; and
    about 15 mole % acrylamide.

6. A drilling fluid system comprising:
    an aqueous base consisting essentially of freshwater;
    bridging agent comprising from about 0.7 to about 29 kg/m$^3$ (0.25 lb/bbl to about 10.0 lb/bbl) water soluble polymer having a 5% by weight Brookfield viscosity in freshwater of from about 50 to about 100 cP comprising from about 90 to about 80 mole % monomers of acrylamide and from about 10 to about 20 mole % 2-acrylamido-2-methylpropane sulfonic acid or alkali metal salts thereof; and,
    plugging agent comprising a quantity of from about 21 to 58 kg/m$^3$ (7.5 to 20 lb/bbl) sulfonated asphalt comprising lignite;
    wherein, after 16 hours of static aging of the drilling fluid system at about 260° C. (500° F.), the drilling fluid system exhibits a HPHT filtrate of 25 cm$^3$/min or less after 30 minutes at about 149° C. (300° F.).

7. The drilling fluid system of claim 6 exhibiting a HPHT filtrate of 25 cm$^3$/min or less after 30 minutes at about 177° C. (350° F.).

8. The drilling fluid system of claim 6 exhibiting said HPHT filtrate at a content of 10,000 ppm or less monovalent salt and the plugging agent comprises from about 20 wt. % to about 30 wt. % lignite.

9. The drilling fluid system of claim 6 exhibiting said HPHT filtrate at a content of 9,000 ppm or less monovalent salt, wherein said amount of water soluble polymer is from about 2.8 to about 11.5 kg/m$^3$ (1 to about 4 lb/bbl).

10. The drilling fluid system of claim 6 wherein said water soluble polymer comprising about 55 mole % 2-acrylamido-2-methylpropane sulfonic acid; and, about 15 mole % acrylamide.

* * * * *

UNITED STATES PATENT AND TRADEMARK OFFICE
CERTIFICATE OF CORRECTION

PATENT NO. : 7,651,980 B2  Page 1 of 1
APPLICATION NO. : 11/346453
DATED : January 26, 2010
INVENTOR(S) : Michael Jarrett and Dennis Clapper It is certified that error appears in the above-identified patent and that said Letters Patent is hereby corrected as shown below:

Col. 46 lines 1-6
Please cancel claim 10.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,651,980 B2
APPLICATION NO. : 11/346453
DATED : January 26, 2010
INVENTOR(S) : Michael Jarrett and Dennis Clapper It is certified that error appears in the above-identified patent and that said Letters Patent is hereby corrected as shown below:

Delete the title page and substitute therefore the attached title page showing the corrected number of claims in patent.

Col. 46 lines 1-6
Please cancel claim 10.

This certificate supersedes the Certificate of Correction issued June 1, 2010.

Signed and Sealed this

Twenty-ninth Day of June, 2010

David J. Kappos
*Director of the United States Patent and Trademark Office*

(12) United States Patent
Jarrett et al.

(10) Patent No.: US 7,651,980 B2
(45) Date of Patent: Jan. 26, 2010

(54) HIGH TEMPERATURE FILTRATION CONTROL USING WATER BASED DRILLING FLUID SYSTEMS COMPRISING WATER SOLUBLE POLYMERS

(75) Inventors: Michael Jarrett, Houston, TX (US); Dennis Clapper, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 707 days.

(21) Appl. No.: 11/346,453

(22) Filed: Feb. 2, 2006

(65) Prior Publication Data
US 2007/0179064 A1    Aug. 2, 2007

(51) Int. Cl.
*C09K 8/36* (2006.01)

(52) U.S. Cl. ............ 507/120; 507/123; 507/145; 507/222; 507/225; 507/229; 252/8.51; 252/8.515; 252/8.514

(58) Field of Classification Search ............ 507/120
See application file for complete search history.

(56) References Cited

U.S. PATENT DOCUMENTS

| | | | |
|---|---|---|---|
| 4,293,427 A | 10/1981 | Lucas et al. | |
| 4,645,609 A | * 2/1987 | Patel | ............ 507/106 |
| 4,652,606 A | 3/1987 | Slingerland | |
| 4,741,843 A | * 5/1988 | Garvey et al. | ............ 507/121 |
| 4,743,383 A | 5/1988 | Stewart et al. | |
| 5,502,030 A | 3/1996 | Patel | |
| 5,693,698 A | 12/1997 | Patel et al. | |
| 5,789,349 A | 8/1998 | Patel | |
| 5,855,244 A | 1/1999 | Ahmed et al. | |
| 6,030,928 A | 2/2000 | Stahl et al. | |
| 6,124,245 A | 9/2000 | Patel | |
| 6,196,317 B1 | 3/2001 | Hardy | |
| 6,590,050 B1 | 7/2003 | Bair et al. | |
| 6,767,867 B2 | 7/2004 | Chatterji et al. | |
| 6,818,596 B1 | 11/2004 | Hayes | |

OTHER PUBLICATIONS

The International Bureau of WIPO, "PCT International Preliminary Report on Patentability," Int'l Application No. PCT/US2007/001673, mailed Aug. 14, 2008 (6 pages).

ISA/US, "PCT Notification of Transmittal of the International Search Report and the Written Opinion of the International Searching Authority, or the Declaration," Int'l Application No. PCT/US07/01673, mailed Oct. 1, 2007 (9 pages).

* cited by examiner

*Primary Examiner*—Timothy J. Kugel
*Assistant Examiner*—Atnaf Admasu
(74) *Attorney, Agent, or Firm*—Paula Morris; The Morris Law Firm, P.C.

(57) ABSTRACT

A method and drilling fluid system for providing filtration control during drilling operations using a drilling fluid system comprising water soluble polymer comprising acrylamide monomer, the method comprising: providing a drilling fluid system having effective rheological properties, the drilling fluid system comprising aqueous base consisting essentially of freshwater, a quantity of from about 21 to 58 kg/m$^3$ (7.5 to about 20 pounds per barrel) plugging agent, and an amount of bridging agent comprising water soluble polymer comprising acrylamide monomer which exhibits a 5% by weight Brookfield viscosity in freshwater of from about 50 cP to about 100 cP, and; contacting a subterranean formation with the drilling fluid system and maintaining effective filtration control at concentrations of about 10,000 ppm or less monovalent salt, as demonstrated in the laboratory by producing a HPHT filtrate of 25 cm$^3$/min or less after 30 minutes at about 149° C. (300° F.) after static aging of said drilling fluid system for a period of 16 hours or more at temperatures of about 260° C. (500° F.).

9 Claims, No Drawings